US011120510B1

(12) United States Patent
Mitchell et al.

(10) Patent No.: US 11,120,510 B1
(45) Date of Patent: Sep. 14, 2021

(54) METHODS AND SYSTEMS TO AUTOMATICALLY GENERATE INSURANCE POLICY DATA BASED UPON LIFE EVENT DATA

(71) Applicant: STATE FARM MUTUAL AUTOMOBILE INSURANCE COMPANY, Bloomington, IL (US)

(72) Inventors: Paul D. Mitchell, Danvers, IL (US); Amy Engelhorn, Normal, IL (US); Kathryn E. Knarr, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 50 days.

(21) Appl. No.: 16/797,500

(22) Filed: Feb. 21, 2020

Related U.S. Application Data

(63) Continuation of application No. 15/007,950, filed on Jan. 27, 2016, now Pat. No. 10,607,294.

(60) Provisional application No. 62/111,374, filed on Feb. 3, 2015.

(51) Int. Cl.
*G06Q 40/08* (2012.01)
(52) U.S. Cl.
CPC .................. *G06Q 40/08* (2013.01)
(58) Field of Classification Search
CPC ....................................... G06Q 40/08
USPC ............................................. 705/4
See application file for complete search history.

(56) References Cited

U.S. PATENT DOCUMENTS

| 8,073,715 B1* | 12/2011 | Smith | G06Q 30/00 705/36 R |
| 8,577,699 B1* | 11/2013 | Diener | G06Q 40/08 705/1.1 |
| 8,706,531 B1* | 4/2014 | Voigt | G06Q 40/08 705/1.1 |

(Continued)

OTHER PUBLICATIONS

Switching Insurance Agents Aug. 7, 2009 (Year: 2009).*
Clay, Switching Insurance Agents, Car Insurance Guidebook, Aug. 7, 2009 (Year: 2009).

*Primary Examiner* — William E Rankins
(74) *Attorney, Agent, or Firm* — Marshall, Gerstein & Borun LLP

(57) ABSTRACT

Methods and systems are provided to automatically generate insurance policy data and/or update insurance policies. More particularly, methods and systems are provided to automatically generate insurance policy data and/or update insurance policies based upon life events and/or life event data. The life events and/or life event data may be representative of personal changes and/or life events (e.g., marriage; child birth; divorce; personal injury; purchase of a house; purchase of a vehicle; adoption; move to a different home, apartment, or state; employment change; health change; etc.) related to an insured person. The life events and/or life event data may automatically lead to providing insurance recommendations and/or adjusting insurance policies that provide insurance-based cost savings to insurance customers, more appropriate insurance coverage given the new circumstances, and/or enhance the customer experience. The insurance policies may be auto, home, renters, personal articles, life, health, pet, and/or other types of insurance policies.

20 Claims, 13 Drawing Sheets

(56) References Cited

U.S. PATENT DOCUMENTS

| | | | | |
|---|---|---|---|---|
| 9,836,793 B2* | 12/2017 | Busque | ................... | G06Q 40/08 |
| 9,940,674 B2* | 4/2018 | Diefendorf | ............ | G06Q 40/08 |
| 10,535,104 B1 | 1/2020 | Mitchell et al. | | |
| 10,607,294 B1 | 3/2020 | Mitchell et al. | | |
| 2004/0233040 A1 | 11/2004 | Lane et al. | | |
| 2007/0244807 A1 | 10/2007 | Andringa et al. | | |
| 2012/0101852 A1* | 4/2012 | Albert | .................... | G06Q 40/08 |
| | | | | 705/4 |
| 2012/0191596 A1* | 7/2012 | Kremen | ................. | G06Q 40/02 |
| | | | | 705/38 |
| 2013/0073318 A1* | 3/2013 | Feldman | ................ | G06Q 40/08 |
| | | | | 705/4 |
| 2013/0110881 A1 | 5/2013 | Bender | | |
| 2014/0039935 A1* | 2/2014 | Rivera | ................... | G06Q 40/08 |
| | | | | 705/4 |
| 2014/0222469 A1* | 8/2014 | Stahl | ...................... | G06Q 40/08 |
| | | | | 705/4 |
| 2015/0006206 A1* | 1/2015 | Mdeway | ............... | G06Q 40/08 |
| | | | | 705/4 |
| 2016/0321935 A1* | 11/2016 | Mohler | .................... | G09B 5/08 |

* cited by examiner

Household Information - SF EBR 14.4 — 305

315 — Customer Households ▼ | 320 — Household ▼ | 325 — Customer ▼

Agent Name: _____ Phone: Home — 311  
Email:

Product Actions ▼ — 330

| App Quote ▼ | Activities ▼ — 335 | Marketing ▼ — 340 | Page Actions ▼ — 345 |

With State Farm: Auto(2) Fire(2) Life(1) Health(0) Bank(0) Mutual Fund(0) SFPP(1) — 346  
With Other Companies: Auto(0) Fire(0) Life(0) Health(0) Bank(0) Mutual Fund(0) — 347  
Previous Review: Select    Next Review: Select    Assigned Staff: Select — 348  
Add Products with Others | Production Manager — 353  
help on this page — 349, 350

Insurance (5) — 365 | Bank (0) — 366 | Mutual Funds (0) — 367 | SFPP (1) — 368 | Products with Others (0) — 369 | Inactive Policies — 370

Description — 355         371 MR    372 Name      364 Number    373 Status    374 Agent  
Auto — 356  
  ☐ -2009 DODGE RAM 1500 PICKUP — 357                                          375 — Active  
  ☐ -2005 CHRYSLER SEBRING 4DR — 358                                           376 — Active  
Fire — 359  
  HOMEOWNERS POLICY — 360                                                      377 — Active  
  RENTAL DWELLING POL - SPECIAL FORM — 361                                     378 — Active  
Life — 362  
  SPECIAL ORDINARY — 363                                                       379 — Active ⊕ Comments  *Click inside to edit* — 380, 381

Activity Actions ▼ — 382

| Due — 384 | Created — 385 | Modified — 386 | Status — 387 | Customer — 388 | Description | Line — 389 | Assigned To — 390 | 391 |
|---|---|---|---|---|---|---|---|---|
| 383 | 01/06/2012 | 01/06/2012 | | | | A | | |
| 392 | | | | | 393 | | | |

Member Actions ▼

METHODS AND SYSTEMS TO AUTOMATICALLY GENERATE INSURANCE POLICY DATA BASED UPON LIFE EVENT DATA

CROSS REFERENCE TO RELATED APPLICATION

This application is a continuation of U.S. patent application Ser. No. 15/007,950, entitled METHODS AND SYSTEMS TO AUTOMATICALLY GENERATE INSURANCE POLICY DATA BASED UPON LIFE EVENT DATA, filed Jan. 27, 2016, the disclosure of which is incorporated herein in its entirety by reference.

TECHNICAL FIELD

The present disclosure generally relates to methods and systems to automatically generate insurance policy data. More particularly, the present disclosure relates to methods and systems to automatically generate life event data and/or insurance policy data (and/or adjust insurance policies) based upon life event data or life events.

BACKGROUND

Insurance customers may have an insurance policy, or insurance policies, that cover a wide range of items, such as vehicles, homes, life, health, etc. An associated insurance policy rate may be based upon a number of life events, such as a change in marital status of an insured customer, type of vehicle(s) owned by the insured customer, employment of the insured, employment of a spouse of an insured customer, a number of children of the insured customer, a number of vehicles owned by the insured customer, etc.

Currently, when an insurance customer incurs a change via a life event, the insurance customer may contact an insurance agent or representative, and then the insurance agent or representative may make associated adjustments to a corresponding insurance policy. The insurance agents or representatives may rely on training, along with both written and non-written procedures, for interacting with customers, and submitting policy transactions.

SUMMARY

In one aspect, a computer implemented method for automatically generating insurance policy data may include automatically receiving, at a processor of a computing device, life event data from an electronic device, in response to the processor executing a life event data receiving module. The life event data may be representative of a life event of an insurance customer. The method may also include automatically generating, using a processor of a computing device, insurance policy data, based upon the life event data, in response to the processor executing an insurance policy data generation module. The insurance policy data may be representative of an insurance policy incorporating the life event of the insurance customer.

In another aspect, a computer system for automatically generating insurance policy data may include a life event data receiving module stored on a memory that, when executed by a processor of a computing device, causes the processor to automatically receive life event data. The life event data may be representative of a life event of an insurance customer. The system may also include an insurance policy data generation module stored on a memory that, when executed by a processor of a computing device, causes the processor to automatically generate insurance policy data, based upon the life event data. The insurance policy data may be representative of an insurance policy incorporating at least one life event of the insurance customer.

In another aspect, a non-transitory computer-readable medium storing instructions that, when executed by a processor of a computing device, may cause the processor to automatically generate insurance policy data and may include a life event data receiving module that, when executed by a processor of a computing device, may cause the processor to automatically receive life event data. The life event data may be representative of a life event of an insurance customer. The non-transitory computer-readable medium may also include an insurance policy data generation module that, when executed by a processor of a computing device, may cause the processor to automatically generate insurance policy data, based upon the life event data. The insurance policy data may be representative of an insurance policy incorporating at least one life event of the insurance customer.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed herein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 1 depicts an exemplary user interface for use in automatically generating life event data and/or insurance policy data based upon life event data and/or life events;

FIG. 2 depicts an exemplary user interface for use in automatically generating life event data and/or insurance policy data based upon life event data and/or life events;

FIG. 3 depicts an exemplary user interface for use in automatically generating life event data and/or insurance policy data based upon life event data and/or life events;

Figure 4:
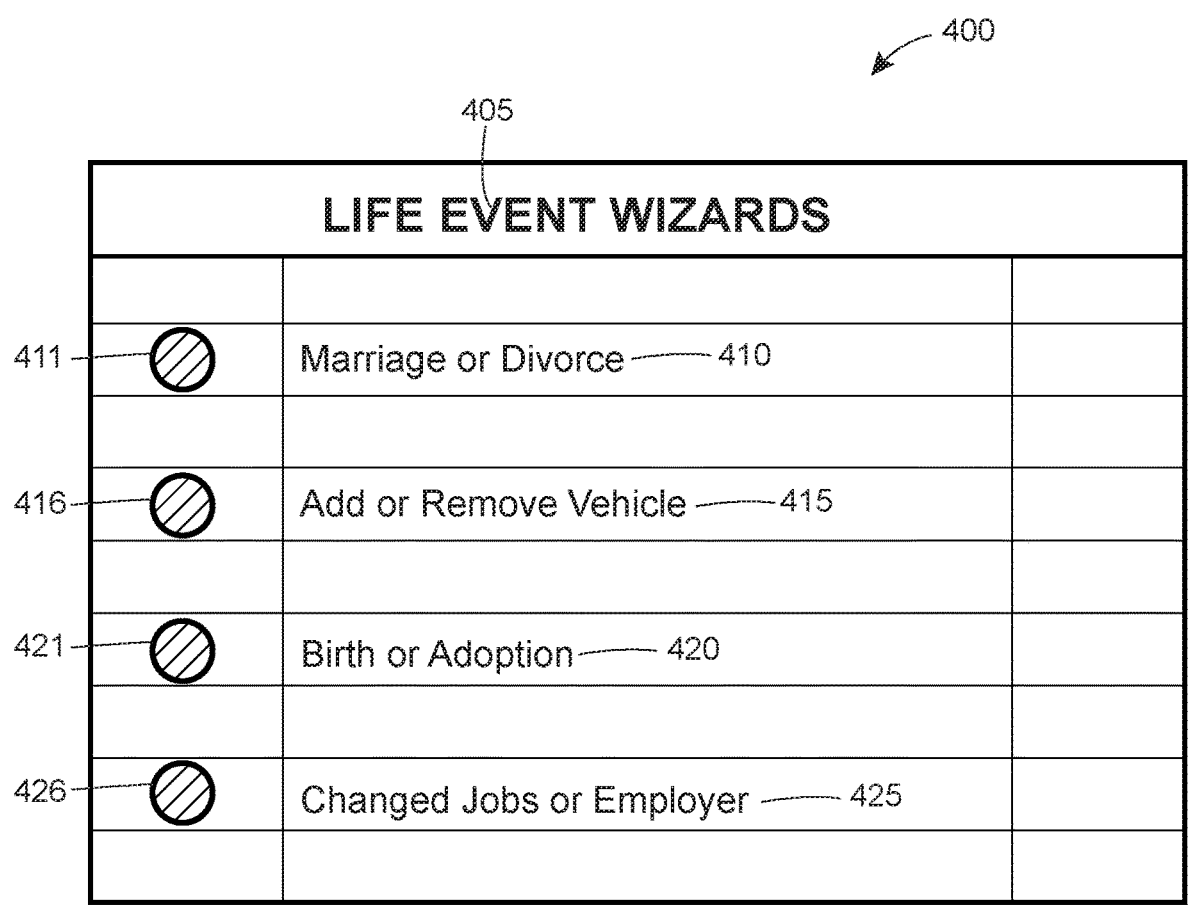
FIG. 4 depicts an exemplary user interface for use in automatically generating life event data and/or insurance policy data based upon life event data and/or life events.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Methods and systems for automatically generating life event data, and/or insurance policy data based upon life event data and/or life events, may employ consistent behaviors allowing customers to update their insurance information either online or via an associate due to a life event. Alternatively, or additionally, the methods and systems may automatically obtain life event data, and may automatically generate insurance policy data based upon the automatically obtained life event data or notifications of life events. For example, the methods and systems may automatically obtain life event data from various life event data sources (e.g., a bureau of motor vehicles, a court, a country, a state, a county, a local municipality, a government agency, service providers, cable companies, medical services providers, hospitals, police or fire departments, veterinary clinics, new papers, internet websites or webpages, third party databases, merchants, online retailers, car dealerships, etc.) with the permission of the insured, such as based upon an indication received by the insured that they would like to opt-in to an insurance program that automatically provides insurance cost savings and/or recommendations based upon life events.

The methods and systems may utilize an insurance customer user interface (e.g., an "Event Wizards" to navigate the customer and/or insurance agent or representative through common consideration points that may be designed to increase completeness and consistency of an associated interaction, and the resulting data. Thereby, the methods and systems may result in higher data quality, increased customer satisfaction, and/or reduced cost, via consistent behaviors and communications. Automation of common procedures, triggered by customers' life events, may reduce computer processing times, memory requirements and/or related facilities. Using the methods and systems, insurance customers may be navigated through consistent processes, focused on relevant information to the life event, and correlated with impacts to the insurance customer and related agreement information.

Customers may interact with the insurance provider, due to life events, for various reasons. Often times, when a customer finds themselves contacting an insurance provider, they may know their own information, but are unaware of what to communicate, and/or why/how the information matters. By utilizing an "Event Wizards" to navigate the customer/insurance Agent through common consideration points, associated completeness and consistency of the interaction, and/or resulting data may be improved. Thus, resulting in higher data quality, increased customer satisfaction, enhanced customer experience, and/or reduced cost.

In an exemplary circumstance, a customer may indicate that they have gotten married (i.e., a marriage life event). The systems and methods may, via an associated user interface, inquire as to whether there was a name change. If a gender of the insurance customer is female, the systems and methods may determine that there is an increased likelihood of surname change. The methods and systems may further inquire as to whether there was an address change. The systems and methods may determine that marriage has an increased likelihood of one or both associated parties having relocated. In other words, the methods and systems may generate questions based upon a given life event change (e.g., marital status).

The systems and methods may also determine whether the associated spouse is a customer (i.e., may find or create a party for association). Thereby, the systems and methods may automatically update personal relationships (i.e., a life event may indicate a spousal relationship and potential dependency relationships) based upon associated life event data. Accordingly, the methods and systems may automatically determine whether there insurance policies that need updates (e.g., new relationships may effect policy owners, beneficiaries, etc.) based upon associated life event data. A life event may also effect or impact an insurance rating, an insurance premium, and/or insurance discounts (e.g., multiline insurance or multi-vehicle insurance).

The methods and systems may automatically determine that insurance policy transfers are needed due to, for example, a state/boundary change (e.g., auto and fire have to transfer due to state boundaries) based upon associated life event data and/or life event (such as a move to new address or new state). The systems and methods may automatically determine an insurance agent reassignment, due to, for example, state/boundary change (e.g., state-product licenses, distance from existing agent, etc.), based upon associated life event data and/or life event.

The systems and methods may automatically determine whether a new customer's needs (e.g., missing or too much insurance coverage, decreased or increased insurance risk, and/or financial changes) based upon associated life event data and/or life events (e.g., age, marital status, education status, employment status, etc.). The systems and methods may automatically determine whether new marketing opportunities exist (e.g., once servicing is complete, up-sell, cross-sell and/or pivot products) based upon associated life event data and/or life events (e.g., new spouse, new child, new dependent, changes to health or life style, new purchases or personal belongings, new pets, births, deaths, moves, etc.).

The systems and methods may automatically determine that sub-life events, or correlating life events, exist based upon initial life event data, and/or sub-life events may be recognized during an associated customer interaction. Thus, resulting in multiple interactions and continued consideration points, as new information is collected and as the insurance customer and/or agent or representative is navigated via the "Event Wizard." The methods and systems may automatically present customer event driven decision/direction/considerations which, may include common events such as: addition or reduction of insurance coverage; the insurance customer purchased a vehicle/property/object; the insurance customer traded/switched/sold a vehicle/property/object; the insurance customer moving—change of address; changes in household members; marriage/divorce/separation; a new child—birth and adoption; college or extended education relationships/locations; dependents leaving and becoming independents; returning members—adult children and elders; insurance claims; change of employment; new pets; and/or financial considerations.

Insurance policies, premiums, rates, discounts, etc. may be adjusted, generated, or generated based upon the life events and/or life event data or information gathered. The insurance policies may relate to auto, home, life, health, personal articles, personal property, pet, burial, and/or other types of insurance.

Figure 1:
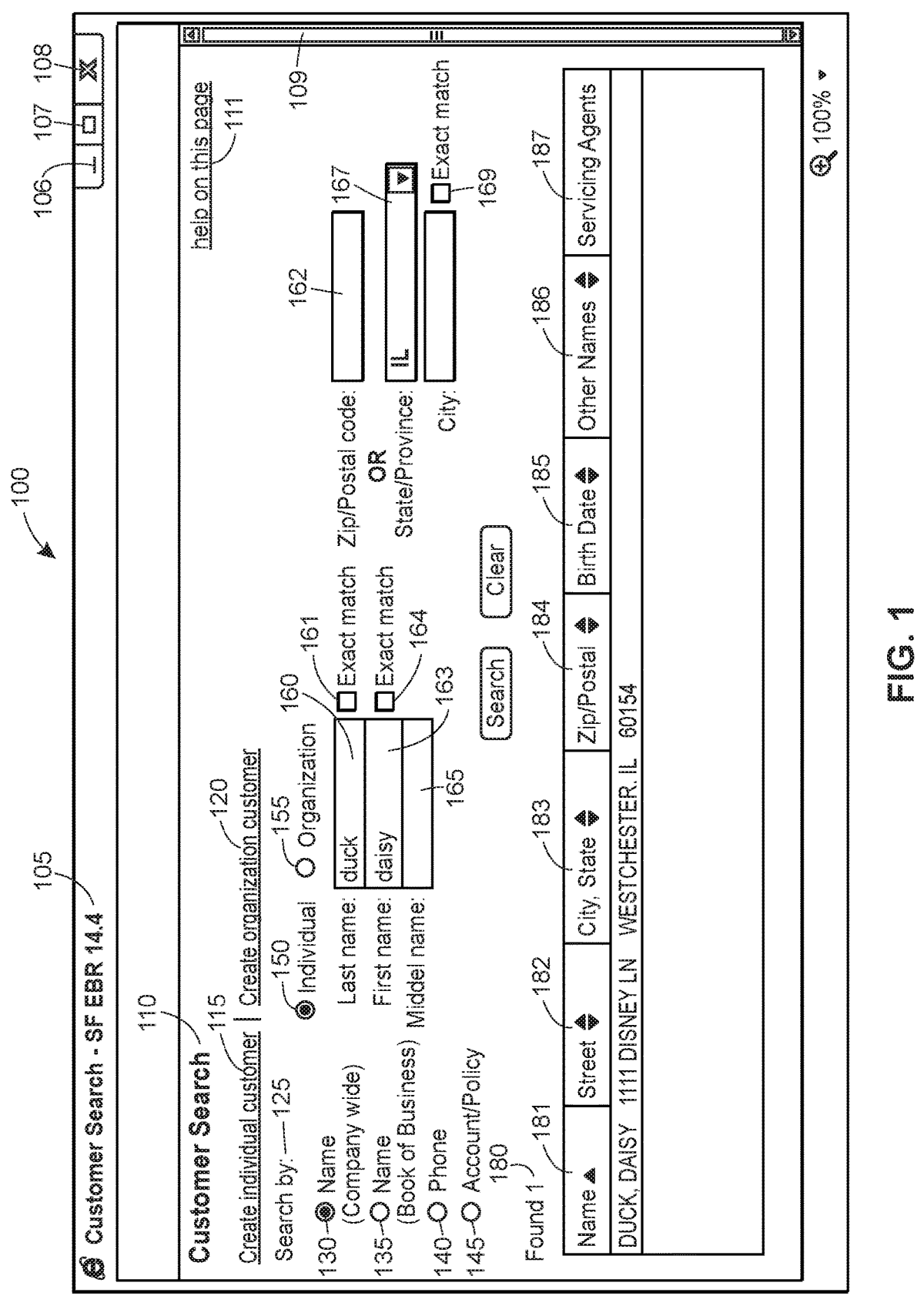
Figure 5:
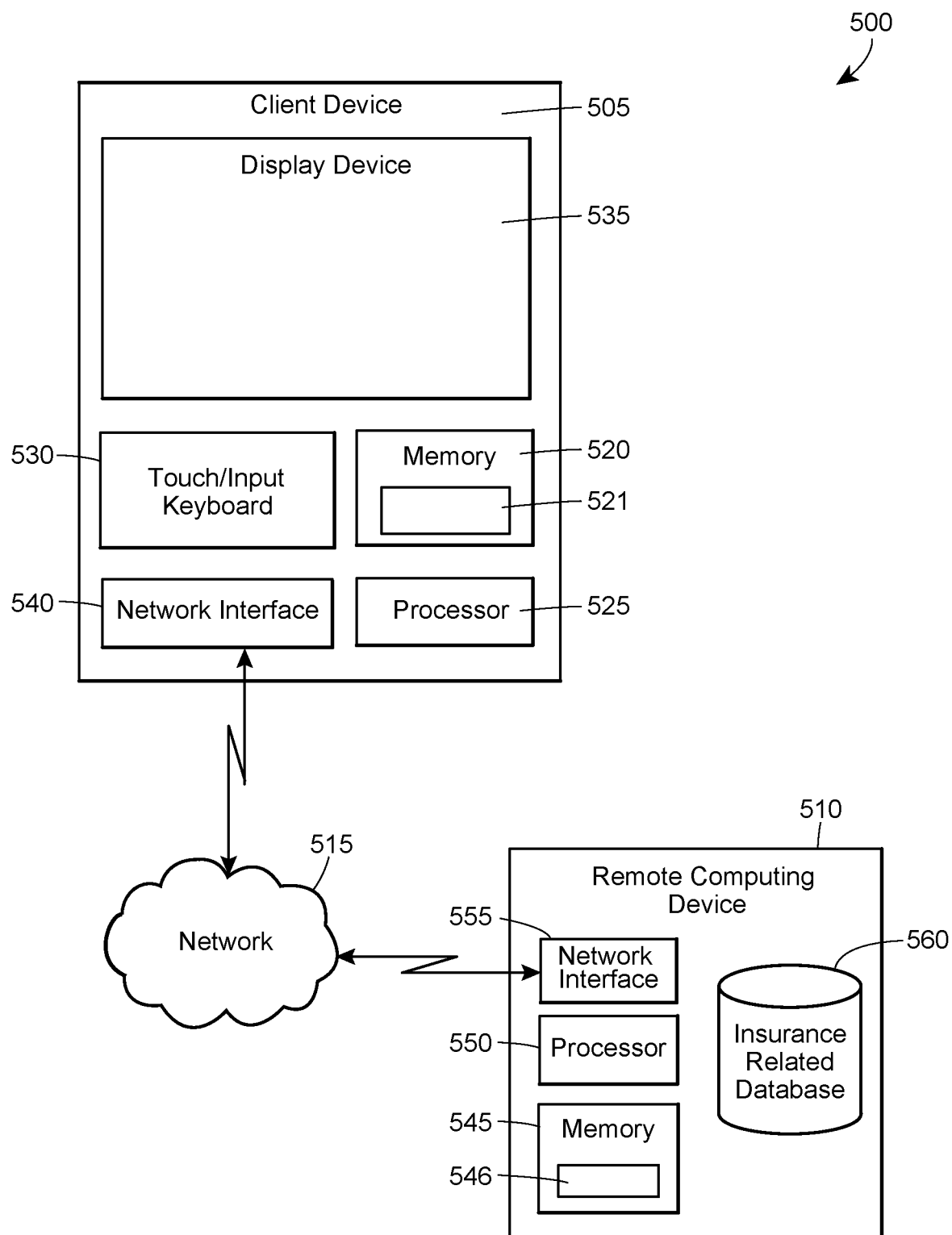
FIG. 5 depicts a high-level block diagram for an exemplary computer system for automatically generating life event data and/or insurance policy data based upon life event data and/or life events.
Figure 6:
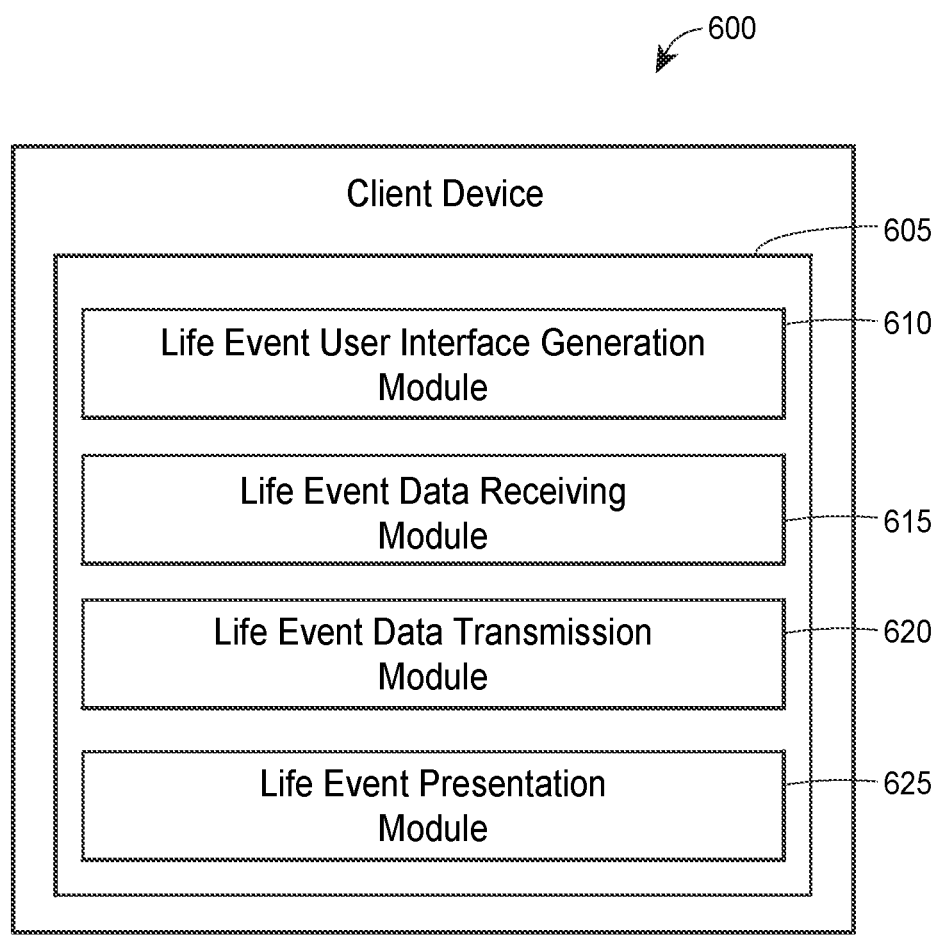
FIG. 6 depicts a block diagram for an exemplary client device for automatically generating life event data and/or insurance policy data based upon life event data.

Exemplary User Interface for Automatically Generating Life Event Data and/or Insurance Policy Data Based Upon Life Events Turning to FIG. 1, a user interface for automatically generating life event data and/or insurance policy data (and/or insurance policies, quotes, pricing, discounts, etc.) based upon life event data and/or life events 100 may be generated by, for example, a processor (e.g., processor 525 of client device 505 of FIG. 5) executing, for example, a user interface module (e.g., life event user interface generation module 610 of FIG. 6).

The user interface 100 may include a title 105 (e.g., customer search SF EBR 144), a minimize screen size selection icon 106, a maximize screen size selection icon 107, an exit selection icon 108, a screen scroll bar selection 109, a help on this page selection link 111, a customer search information area 110 having a create individual customer selectable link 115, a create organization customer selectable link 120, a search by selection 125 area, and/or a found presentation area 180. The search selection area 125 may include a name (companywide) selection 130, a name (book of business) selection 135, a phone selection 140, an account/policy selection 145, an individual selection 150, an organization selection 155, a last name entry field 160 with an exact match selection 161, a first name entry field 163 with an exact match selection 164, a middle name entry field 165, zip/postal code entry field 162, a state/province pull-down selection menu 167, a city entry field 168 with an exact match selection 169, a search selection icon 170, and/or a clear selection icon 175. The found area 180 may include a name column 181, a street column 182, a city, state column 183, a zip/postal column 184, a birth data column 185, an other names column 186 and/or a servicing agent(s) column 187.

Once information associated with items 130-169 is selected/entered and the search selection icon 170 is activated, information associated with any/all individuals/organizations, that meet the criteria of items 130-169, may be displayed in the found area 180 columns or lists 181-187. The user interface 100 may include additional, less, or alternate functionality, including that discussed elsewhere herein.

Figure 2:
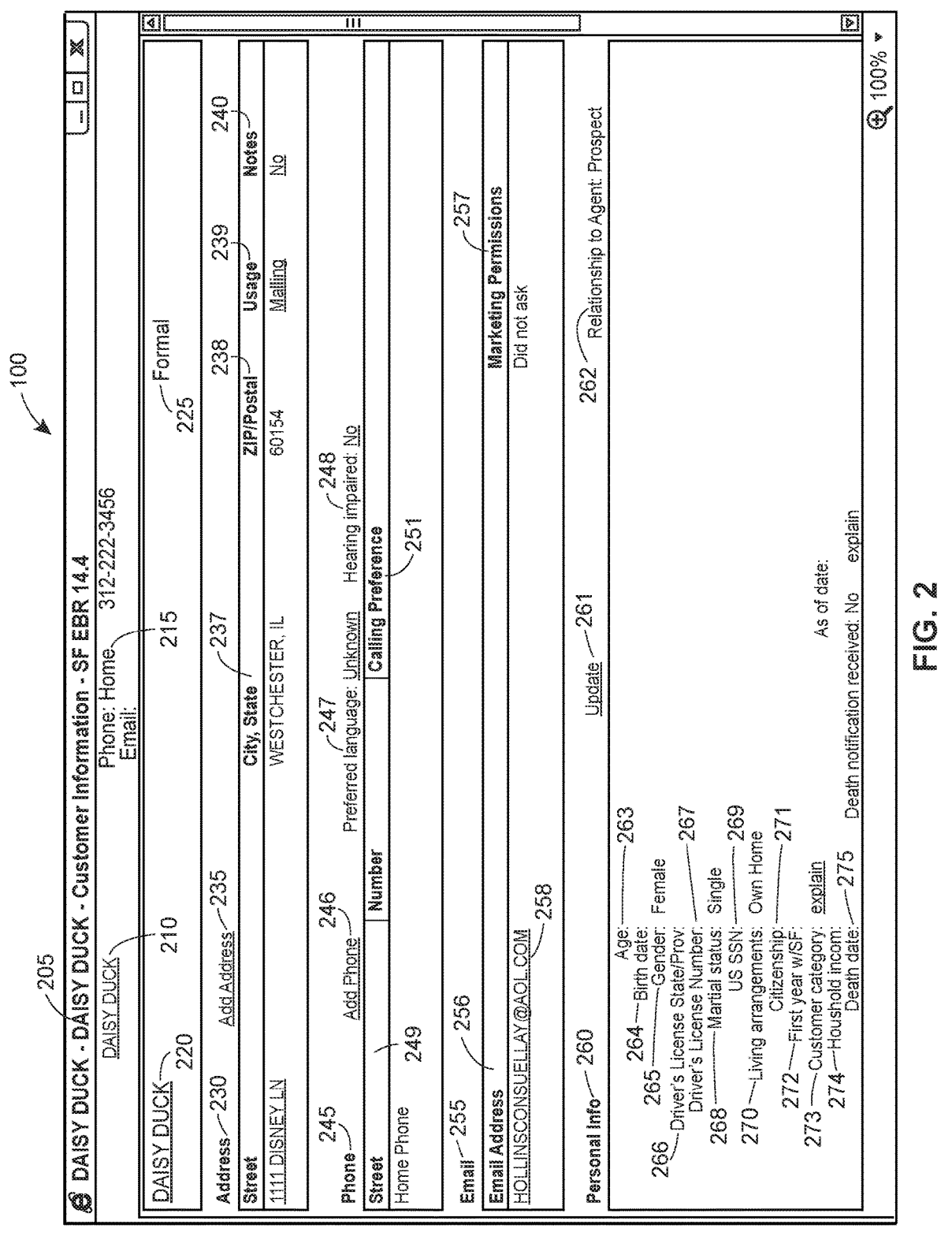

Exemplary User Interface for Automatically Generating Life Event Data and/or Insurance Policy Data Based Upon Life Events With reference to FIG. 2, a user interface for automatically generating life event data and/or insurance policy data (and/or insurance policies quotes, pricing, discounts, etc.) based upon life event data and/or life events 200 may be generated by, for example, a processor (e.g., processor 525 of client device 505 of FIG. 5) executing, for example, a user interface module (e.g., life event user interface generation module 610 of FIG. 6).

The user interface 200 may include a title 205, an insurance customer name selection link 210, a telephone number/email 215 field, an insurance customer name list area 220 with customer information 225, an insurance customer address list area 230, an insurance customer phone list area 245, an insurance customer email list area 255, and/or a personal information area 260. The insurance customer address list area 230 may include an add address selection link 235, a name column 236, a city, state column 237, a zip/postal column 238, a usage column 239 and/or a notes column 240. The insurance customer phone list area 245 may include an "add phone number" selection link 246, a preferred language selection link 247, a hearing impaired selection link 248, a telephone type column 249 (e.g., home, work, cell, etc.), a telephone number column 250, and/or a calling preference column 251 (e.g., day, evening, at home, etc.). The insurance customer email list area 255 may include an email address column 256 with email link(s) 258, and/or a marketing permissions column 259.

The personal information area 260 may include an update selection link 261, a relationship to agent: prospect column 262 (e.g., current customer, neighbor, friend, etc.), an age entry 263, a birth date entry 264, a gender entry 265, a driver's license state/province entry 266, a driver's license number entry 267, a marital status entry 268, a social security number entry 269, a living arrangement entry 270 (e.g., own home, rent, live with parents, etc.), a citizenship entry 271, a first year with insurance company entry 272, a customer category entry 273, household income entry 274, and/or a death date/information area 275.

As reflected in FIG. 2, the user interface 200 may receive information related to a spouse of a customer and, in response, may find or create a party for association. An insurance customer may use the user interface 200 to update personal relationships (e.g., a driving life event may indicate spousal relationship and/or potential dependency relationships). The user interface 200 may include additional, less, or alternate functionality, including that discussed elsewhere herein.

Exemplary User Interface for Automatically Generating Life Event Data and/or Insurance Policy Data Based Upon Life Events Turning to FIG. 3, a user interface for automatically generating life event data and/or insurance policy data (and/or insurance policies quotes, pricing, discounts, etc.) based upon life event data and/or life events 300 may be generated by, for example, a processor (e.g., processor 525 of client device 505 of FIG. 5) executing, for example, a user interface module (e.g., life event user interface generation module 610 of FIG. 6).

The user interface 300 may include a title 305, a screen minimize selection icon 306, a screen maximize selection icon 307, an exit selection icon 308, phone entry 310, an email 311, a customer households selection tab 315, a households selection tab 320, a customer selection tab 325, an application quotation selection tab 330, an activities selection tab 335, a marketing selection tab 340, a page actions selection icon 345, a with insurance company information banner (e.g., auto, home, fire, life, health, mutual fund, bank, etc.), a previous review selection link 347, a next review selection link 348, a help on this page selection link 349, an assign staff selection link 350, a with other companies information banner 351 (e.g., auto, home, fire, life, health, mutual fund, bank, etc.), an add products with other selections link 352, and/or a production manager selection link 353.

The user interface 300 may also include an insurance selection tab 365, a bank selection tab 366, a mutual funds selection tab 367, an insurance company policy selection tab 368, a products with other selection tab 369, and/or an inactive policies selection tab 370. Each selection tab 365-370 may include a description field 355. For example, the insurance selection tab 365 may include a description column 355 having an auto entry 356, a first vehicle 357, a second vehicle 358, a fire entry 359, a home owners policy 360, a rental dwelling policy special form entry 361, a life entry 362, a special ordinary entry 363, a number column 364, a gender identifier column 371, a name column 372, an agent column, and/or a status column 373 with a first status 375, a second status 376, a third status 377, a fourth status 378, and/or a fifth status 379.

The user interface 300 may further include a comments area 380 with, for example, a click inside to edit instruction, an active actions area 382 with an active actions selection tab 381, a due column 383, a created column 384, a modified column 385, a status column 386, a customer column 387, a description column 388, a line column 389, an assigned to column 390, a documents selection icon 391, and/or a member actions area 393 with a member actions selection tab 392.

As reflected in FIG. 3, an insurance customer may determine whether there are insurance policies needing updates (e.g., policy transactions (PT)) via the user interface 300. For example, a name/address (e.g., previously captured information) may be used to establish new relationships that may affect policy owners, beneficiaries, etc. The user interface 300 may include additional, less, or alternate functionality, including that discussed elsewhere herein.

Exemplary User Interface for Automatically Generating Life Event Data and/or Insurance Policy Data Based Upon Life Events With reference to FIG. 4, a user interface for automatically generating life event data and/or insurance policy data (and/or insurance policies quotes, pricing, discounts, etc.) based upon life event data and/or life events 400 may be generated by, for example, a processor (e.g., processor 525 of client device 505 of FIG. 5) executing, for example, a user interface module (e.g., life event user interface generation module 610 of FIG. 6).

The user interface 400 may include a title 405 (e.g., life event wizard), a marriage or divorce option 410 with selection 411, an add or remove vehicle option 415 with selection 416, a birth or adoption 420 with selection 421, and/or a change jobs or employer option 425 with selection 426. The user interface 400 may include additional, less, or alternate functionality, including that discussed elsewhere herein.

Exemplary Computer System for Automatically Generating Life Event Data and/or Insurance Policy Data Based Upon Life Events Turning to FIG. 5, a computer system for generating insurance policy data based upon life events and/or life event data 500 may include a client device 505 in communication with a remote computer device (e.g., a server) 510 via a network 515. The computer system 500 may implement communications between the client device 505 and the remote computing device 505 (e.g., a remote server) to provide, for example, life event data to an insurance related database 560.

For example, the computer system 500 may acquire life event data from, for example, a user of a client or mobile device 505 (e.g., a smart phone, a digital camera, smart watch, smart glasses, wearable electronics, laptop, etc.). Alternatively, or additionally, life event data may be automatically obtained from a third party data source (e.g., a bureau of motor vehicles, a court, a country, a state, a county, a local municipality, a government agency, a utility provider, a cable company, a phone company, etc.) with the permission of the insured, such as receiving a notification from the insured that they would like to opt-in to an insurance program that automatically provides insurance savings and/or recommendations based upon life events.

As described in detail herein, the computer system 500 may automatically generate insurance policy data based upon, for example, life events and/or life event data. The life events and/or life event data, may be representative, for example, a marriage, a divorce, a child birth, a name change, a vehicle purchase, a vehicle sale, a house purchase, a home sale, an adoption, a change in employment, a change in employer, a move into a new apartment or home, a move to a different state, etc.

For clarity, only one client device 505 is depicted in FIG. 5. While FIG. 5 depicts only one client device 500, it should be understood that any number of client devices 505 may be supported and that each client device 505 may be any appropriate computing or mobile device, such as a mobile telephone, a smartphone, a personal data assistant (PDA), a tablet, a phablet, a pager, a smart watch, a smart bracelet, wearable electronics, and/or a lap-top computer. A client device 505 may include a memory 520 and a processor 525 for storing and executing, respectively, a module 521. The module 521, stored in the memory 520 as a set of computer-readable instructions, may be related to an application for generating life event data and/or insurance policy data based upon life events and/or life event data that, when executed on a processor 525, causes data representative of life events, and/or data representative of insurance policies based upon a change in life events, to be stored in the memory 520.

As described in detail herein, the module 521 may facilitate interaction between an associated client device 505 and a remote computing device 510. For example, the processor 525, further executing the module 521, may facilitate communications between a remote computing device 510 and a client device 505 via a network interface 540 and a network 515.

A client or mobile device 505 may include a display device 535 which may be any type of electronic display device, such as a liquid crystal display (LCD), a light emitting diode (LED) display, a plasma display, a cathode ray tube (CRT) display, or any other type of known or suitable electronic display. A display device 535 may exhibit a display which depicts a user interface for configuring a client device 505 to communicate with a remote computing device 510. A client device 505 may include a user input device 530, such as a touch input/keyboard/pointing device (e.g., a mouse) that provides a mechanism for a user of the client device 505 to launch a client device insurance application and, for example, to interact with a system for generating insurance policy data (and/or insurance policies quotes, pricing, discounts, etc.) based upon life events and/or life event data. The user input device 530 may be configured as an integral part of a display device 535, such as a touch screen display device.

The network interface 540 may be configured to facilitate communications between a client device 505 and a remote computing device 510 via any wireless communication network 515, including for example a wireless LAN, MAN or WAN, WiFi, the Internet, or any combination thereof. Moreover, a client device 505 may be communicatively connected to a remote computing device 510 via any suitable communication system, such as via any publicly available or privately owned communication network, including those that use wireless communication structures, such as wireless communication networks, including for example, wireless LANs and WANs, satellite and cellular telephone communication systems, etc. A client device 505 may cause, for example, life event(s) data to be transmitted to, and stored in, for example, a remote server 510, memory 545, and/or a remote insurance related database 560.

A remote computing device 510 may include a memory 545 and a processor 550 for storing and executing, respectively, a module 546. The module 546, stored in the memory 545 as a set of computer-readable instructions, may facilitate applications related to generating insurance policy data based upon life event(s) data. The module 546 may also facilitate communications between the remote computing device 510 and a client device 505 via a network interface 555 and the network 515, and other functions and instructions.

A remote computing device 510 may be communicatively coupled to an insurance related database 560. While the insurance related database 560 is shown in FIG. 5 as being communicatively coupled to the remote computing device 510, it should be understood that the insurance related database 560 may be located within separate remote servers (or any other suitable computing devices) communicatively coupled to the remote computing device 510. Optionally, portions of insurance related database 560 may be associated with memory modules that are separate from one another, such as a memory 520 of a client device 505.

Exemplary Client Device for Generating Life Event Data and/or Insurance Policy Data Based Upon Life Events or Life Event Data With reference to FIG. 6, a client or mobile device 600 may include a life event user interface generation module 610, a life event data receiving module 615, a life event data transmission module 620, and/or a life event presentation module 625 stored on, for example, a memory 605. The client or mobile device 600 may be similar to the client or mobile device 505 of FIG. 1, and/or may include additional, less, or alternate functionality as that discussed elsewhere herein.

Figure 7:
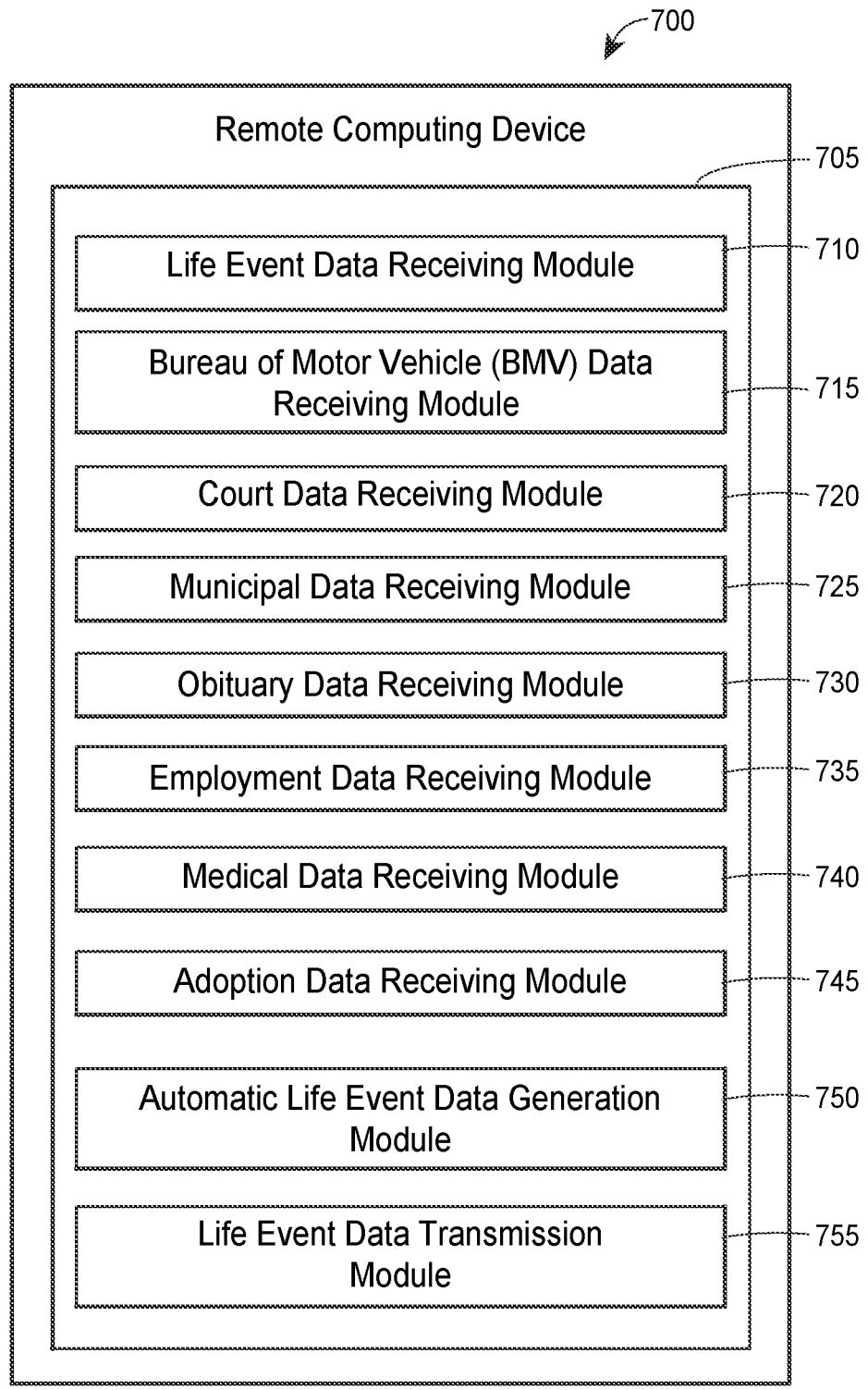
FIG. 7 depicts a block diagram for an exemplary remote computing device for automatically generating life event data and/or insurance policy data based upon life event data and/or life events.

Exemplary Remote Computing Device for Automatically Generating Life Event Data and/or Insurance Policy Data Based Upon Life Events and/or Life Event Data Turning to FIG. 7, a remote computing device 700 may include life event data receiving module 710, a bureau of motor vehicle (BMV) data receiving module 715, a court data receiving module 720, a municipal data receiving module 725, an obituary data receiving module 730, an employment data receiving module 735, a medical data receiving module 740, an adoption data receiving module 745, an automatic life event data generation module 750, and/or a life event data transmission module 755 stored on, for example, a memory 705. The remote computing device 700 may be similar to, for example, the remote computing device 510 of FIG. 5, and/or may include addition, less, or alternate functionality as that discussed elsewhere herein.

Figure 8:
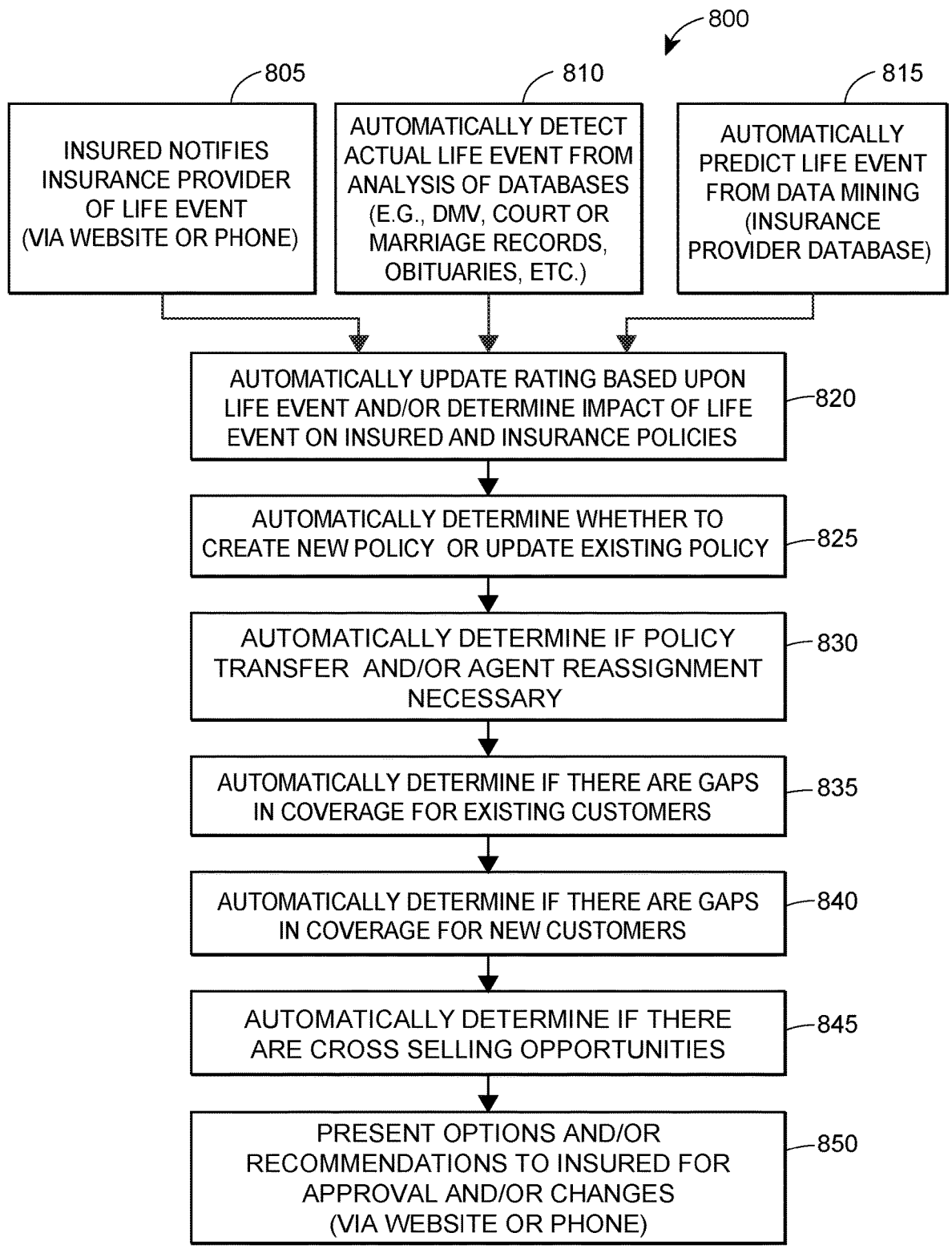
FIG. 8 depicts a flow diagram for an exemplary method for automatically generating life event data and/or insurance policy data based upon life event data and/or life events.

Exemplary Method for Automatically Generating Life Event Data and/or Insurance Policy Data Based Upon Life Event Data With reference to FIG. 8, a method of automatically generating life event data and/or insurance policy data (and/or insurance policies quotes, pricing, discounts, etc.) based upon life event data 800 may be implemented by a first processor (e.g., processor 525 of client device 505 of FIG. 5) executing, for example, at least a portion of modules 610-625 of FIG. 6, and/or a second processor (e.g., processor 550 of remote computing device 510 of FIG. 5) executing, for example, at least a portion of modules 710-755 of FIG. 7. In particular, processor 525 may execute a life event user interface generation module 610 to cause the processor 525 to cause the processor 525 to enable an insured to notify an insurance provider of a life event via, for example, a website or a telephone (block 805).

Alternatively, or additionally, processor 550 may execute a module (e.g., any one of modules 715-745) to cause the processor 550 to automatically detect an actual life event from analysis of data received from a data source (e.g., a bureau of motor vehicles data source, a court data source, a marriage records data source, an obituaries data source, a government agency data source, etc.), such as with an insured's permission to monitor for life events that may provide them with insurance recommendations and/or insurance cost savings (block 810). Alternatively, or additionally, processor 550 may execute a module (e.g., any one of modules 715-745) to cause the processor 550 automatically predict a life event from data mined from at least one data source (e.g., an insurance provider data source), such as with an insured's permission to monitor for life events that may provide them with insurance recommendations and/or insurance cost savings (block 815).

The processor 550 may execute an automatic life event data generation module 750 to cause the processor 550 to automatically update an insurance rating based upon a live event and/or may determine an impact of a life event on an insured and/or an associated insurance policy based upon the life event data (block 820). The processor 550 may execute an automatic life event data generation module 750 to cause the processor 550 to automatically determine whether to create a new insurance policy or to update an existing policy based upon the life event data (block 830).

The processor 550 may execute an automatic life event data generation module 750 to cause the processor 550 to automatically determine if there is at least one gap in insurance coverage for an existing insurance customer based upon the life event data (block 835). The processor 550 may execute an automatic life event data generation module 750 to cause the processor 550 to automatically determine if there is at least one gap in insurance coverage for a new insurance customer based upon the life event data (block 840).

The processor 550 may execute an automatic life event data generation module 750 to cause the processor 550 to automatically determine whether there is at least one cross insurance selling opportunity based upon the life event data (block 845). The processor 550 may execute an automatic life event data generation module 750 to cause the processor 550 to generate insurance policy data (blocks 820-845), and may execute a life event data transmission module 755 to transmit the life event data and/or the insurance policy data to, for example, a client device (e.g., client device 505 of FIG. 5) (block 755). The processor 525 may execute a life event data receiving module 615 to cause the processor 525 to receive the life event data and/or the insurance policy data. The processor 525 may execute a life event presentation module 625 to cause the processor 525 to present options and/or recommendations to an insured for approval and/or changes (block 850). The method 800 may include additional, less, or alternate functionality, including that discussed elsewhere herein.

Figure 9:
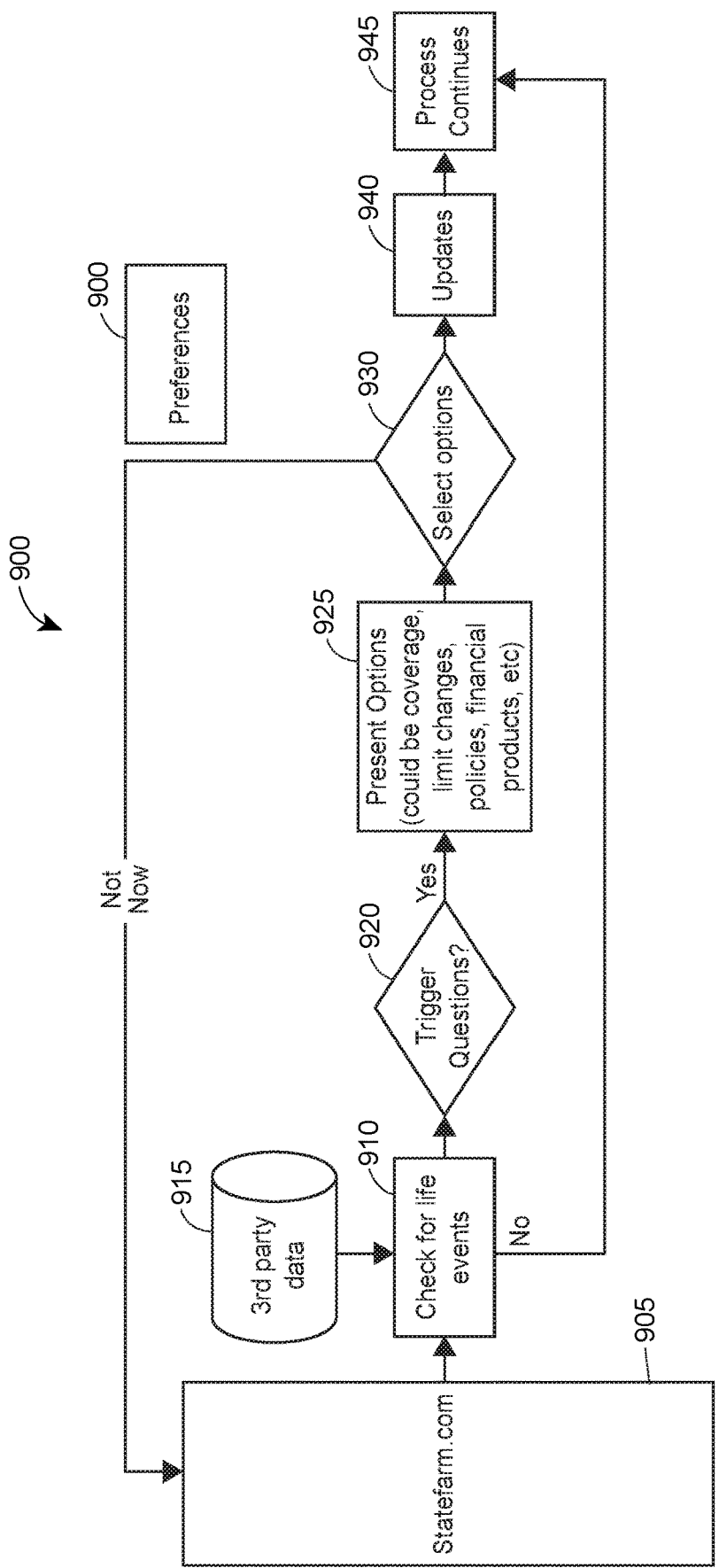
FIG. 9 depicts a flow diagram for an exemplary method for automatically generating life event data and/or insurance policy data based upon life event data and/or life events.

Exemplary Method for Automatically Generating Life Event Data and/or Insurance Policy Data Based Upon Life Event Data Turning to FIG. 9, a method of automatically generating life event data and/or insurance policy data (and/or insurance policies quotes, pricing, discounts, etc.) based upon life events and/or life event data 900 may be implemented by a first processor (e.g., processor 525 of client device 505 of FIG. 5) executing, for example, at least a portion of modules 610-625 of FIG. 6, and/or a second processor (e.g., processor 550 of remote computing device 510 of FIG. 5) executing, for example, at least a portion of modules 710-755 of FIG. 7.

In particular, processor 525 may execute a life event user interface generation module 610 to cause the processor 525 to access, for example, an insurance provide website (block 905). The processor 525 may execute a life event data receiving module 615 to cause the processor 525 to check for life events (block 910). Alternatively, the processor 525 may execute the life event data receiving module 615 to receive life event data from a third party data source (e.g., a bureau of motor vehicles data source, a court data source, a marriage records data source, an obituaries data source, a government agency data source, etc.), such as with an insured's permission to monitor for life events that may provide them with insurance recommendations and/or insurance cost savings (block 915).

Alternatively, or additionally, processor 550 may execute a module (e.g., any one of modules 715-745) to cause the processor 550 to automatically detect an actual life event from analysis of data received from a data source (e.g., a bureau of motor vehicles data source, a court data source, a marriage records data source, an obituaries data source, a government agency data source, etc.), again such as with an insured's permission to monitor for life events that may provide them with insurance recommendations and/or insurance cost savings (block 915).

The processor 525 may execute the life event user interface generation module 610 to cause the processor 525 to determine whether to generate a life event question based upon the life event data (block 920). If the processor 525 determines to generate a life event question (block 920), the processor 525 may execute the life event presentation module 625 to cause the processor 525 to present options based upon the life event data (e.g., insurance coverage, limit changes, insurance policy data, financial products, etc.) (block 925). If the processor 525 determines not to generate a life event question (block 920), the processor 525 may continue the process (block 945).

The processor 525 may execute the life event user interface generation module 610 to cause the processor 525 to allow an insurance customer to select options (block 930). The processor 525 may execute the life event user interface generation module 610 to cause the processor 525 to allow an insurance customer to enter preferences to, for example, configuring the user interface (block 935).

The processor 525 may execute life event data transmission module 620 to cause the processor 525 to transmit life event data and/or insurance policy data to, for example, a processor of a remote computing device (e.g., processor 550 of the remote computing device 510 of FIG. 5) (block 940).

The processor 550 may execute an automatic life event data generation module 750 to cause the processor 550 to update an insurance policy based upon the life event data and/or the insurance policy data (block 940). The method 900 may include additional, less, or alternate actions, including those discussed elsewhere herein.

Figure 10:
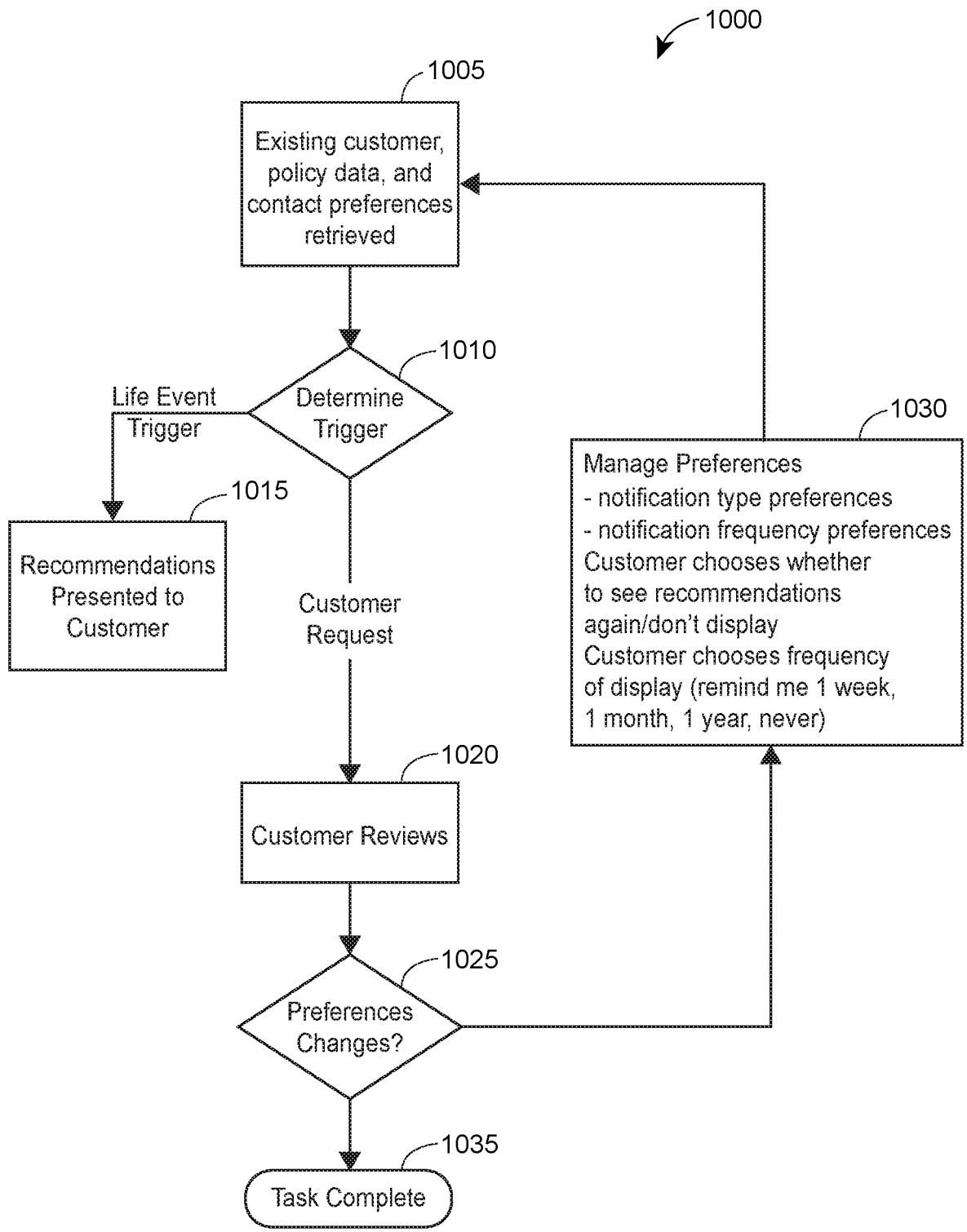
FIG. 10 depicts a flow diagram for an exemplary method for automatically generating life event data and/or insurance policy data based upon life event data and/or life events.

Exemplary Method for Automatically Generating Life Event Data and/or Insurance Policy Data Based Upon Life Event Data With reference to FIG. 10, a method of automatically generating life event data and/or insurance policy data (and/or insurance policies quotes, pricing, discounts, etc.) based upon life events and/or life event data 1000 may be implemented by a first processor (e.g., processor 525 of client device 505 of FIG. 5) executing, for example, at least a portion of modules 610-625 of FIG. 6, and/or a second processor (e.g., processor 550 of remote computing device 510 of FIG. 5) executing, for example, at least a portion of modules 710-755 of FIG. 7. In particular, processor 525 may execute the life event user interface generation module 610 to cause the processor 525 to retrieve insurance policy data and/or insurance customer contact preferences (block 1005).

The processor 525 may execute the life event user interface generation module 610 to cause the processor 525 to determine whether a life event has been triggered (block 1010). If the processor 525 determines that a life event question has been triggered (block 1010), the processor 525 may execute the life event presentation module 625 to cause the processor 525 to present options based upon the life event data (e.g., insurance coverage, limit changes, insurance policy data, financial products, etc.) (block 1015). If the processor 525 determines that no life event question has been triggered (block 1010), the processor 525 may proceed to insurance customer reviews (block 1020). For example, the processor 525 may execute the life event user interface generation module 610 to cause the processor 525 to allow an insurance customer to review options (block 1020).

If the processor 525 determines that an insurance customer wishes to make changes to preferences (block 1025), the processor 525 may execute the life event user interface generation module 610 to cause the processor 525 to allow an insurance customer to enter preferences to, for example, configuring the user interface and/or enter insurance provider contact preferences (block 1030). The method 1000 may include additional, less, or alternate actions, including those discussed elsewhere herein.

Figure 11:
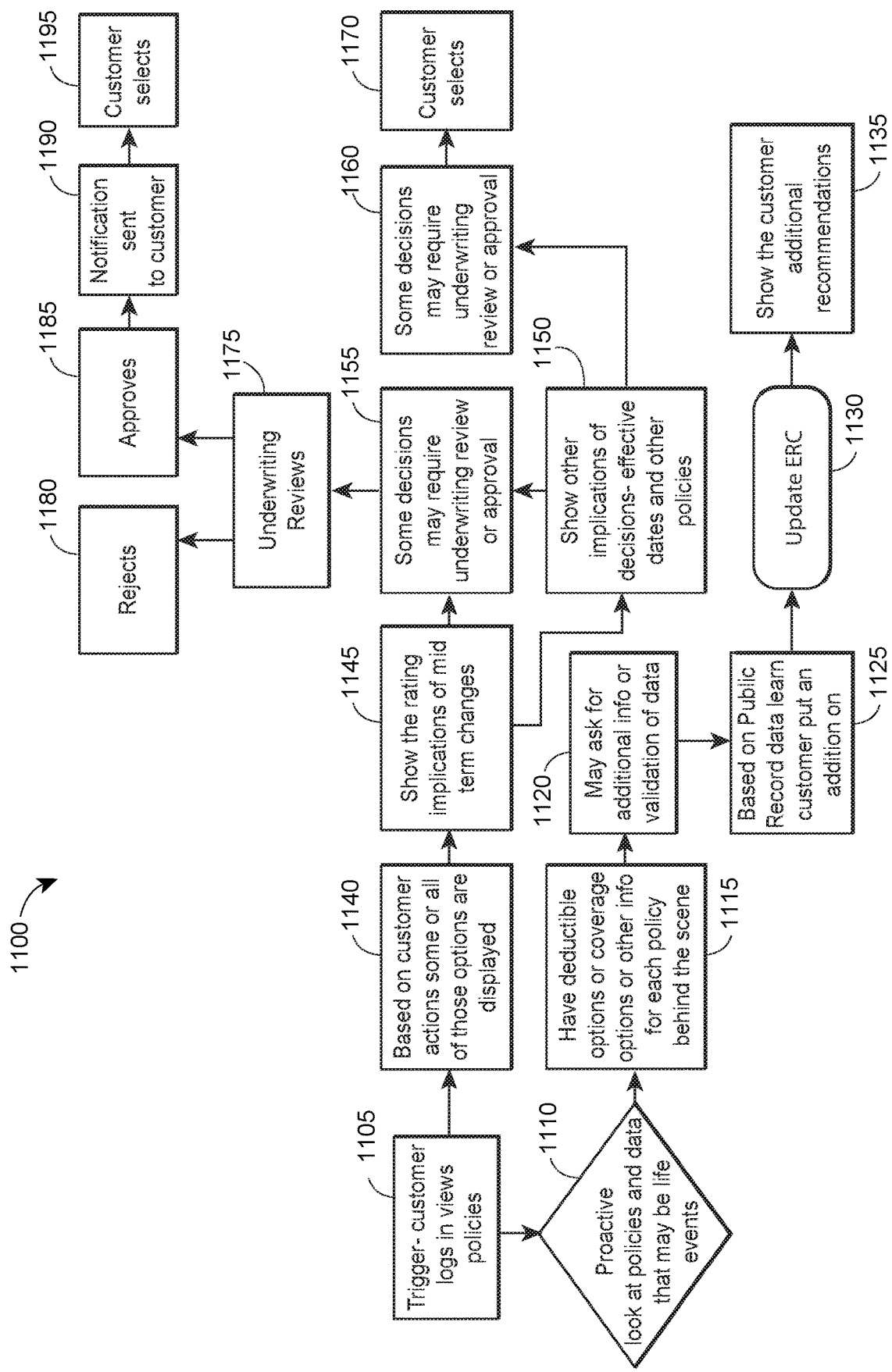
FIG. 11 depicts a flow diagram for an exemplary method for automatically generating life event data and/or insurance policy data based upon life event data and/or life events.

Exemplary Method for Automatically Generating Life Event Data and/or Insurance Policy Data Based Upon Life Event Data Turning to FIG. 11, a method of automatically generating life event data and/or insurance policy data (and/or insurance policies quotes, pricing, discounts, etc.) based upon life events and/or life event data 1100 may be implemented by a first processor (e.g., processor 525 of client device 505 of FIG. 5) executing, for example, at least a portion of modules 610-625 of FIG. 6, and/or a second processor (e.g., processor 550 of remote computing device 510 of FIG. 5) executing, for example, at least a portion of modules 710-755 of FIG. 7.

In particular, processor 525 may execute the life event user interface generation module 610 to cause the processor 525 to allow an insurance customer to view insurance policies (block 1105). The processor 525 may execute the life event user interface generation module 610 to cause the processor 525 to determine whether a life event has been triggered (block 1110).

If the processor 525 determines that a life event question has been triggered (block 1110), the processor 525 may execute the life event presentation module 625 to cause the processor 525 to present options based upon the life event data (e.g., insurance coverage, limit changes, insurance policy data, financial products, etc.) (block 1140). Alternatively, if the processor 525 determines that a life event question has been triggered (block 1110), the processor 525 may retrieve deductible options, coverage options, or other information for each policy (block 1115). For example, the processor 525 may execute the life event user interface generation module 610 to cause the processor 525 to ask an insurance customer additional questions and/or ask for validation of information based upon life event data (block 1120).

The processor 525 may execute the life event presentation module 625 to cause the processor 525 to present additional questions to an insurance customer based upon public record data (block 1125). The processor 525 may execute the life event presentation module 625 to cause the processor 525 to ask an insurance customer to update an ERC (block 1130). The processor 525 may execute the life event presentation module 625 to cause the processor 525 to present additional recommendations to an insurance customer (block 1135). The processor 525 may execute the life event presentation module 625 to cause the processor 525 to present rating implications of midterm changes (block 1145). The processor 525 may execute the life event presentation module 625 to cause the processor 525 to present implications of decisions, effective dates, and other policies (block 1150).

A processor 550 may execute an automatic life event data generation module 750 to cause the processor 550 to determine whether insurance underwriter review is necessary based upon life event data (block 1155). If the processor 550 determines that insurance underwriter review is not necessary (block 1160), the processor 525 may execute the life event user interface generation module 610 to allow the insurance customer to select at least one option (block 1170). If the processor 550 determines that insurance underwriter review is necessary (block 1175), the processor 525 may execute the life event user interface generation module 610 to allow the insurance underwriter to reject at least one option (block 1180), to approve at least one option (block 1185), to send a notification to the insurance customer of at least one option (block 1190), or to allow the insurance customer to select at least one option (block 1195). The method 1100 may include additional, less, or alternate actions, including those discussed elsewhere herein.

Figure 12:
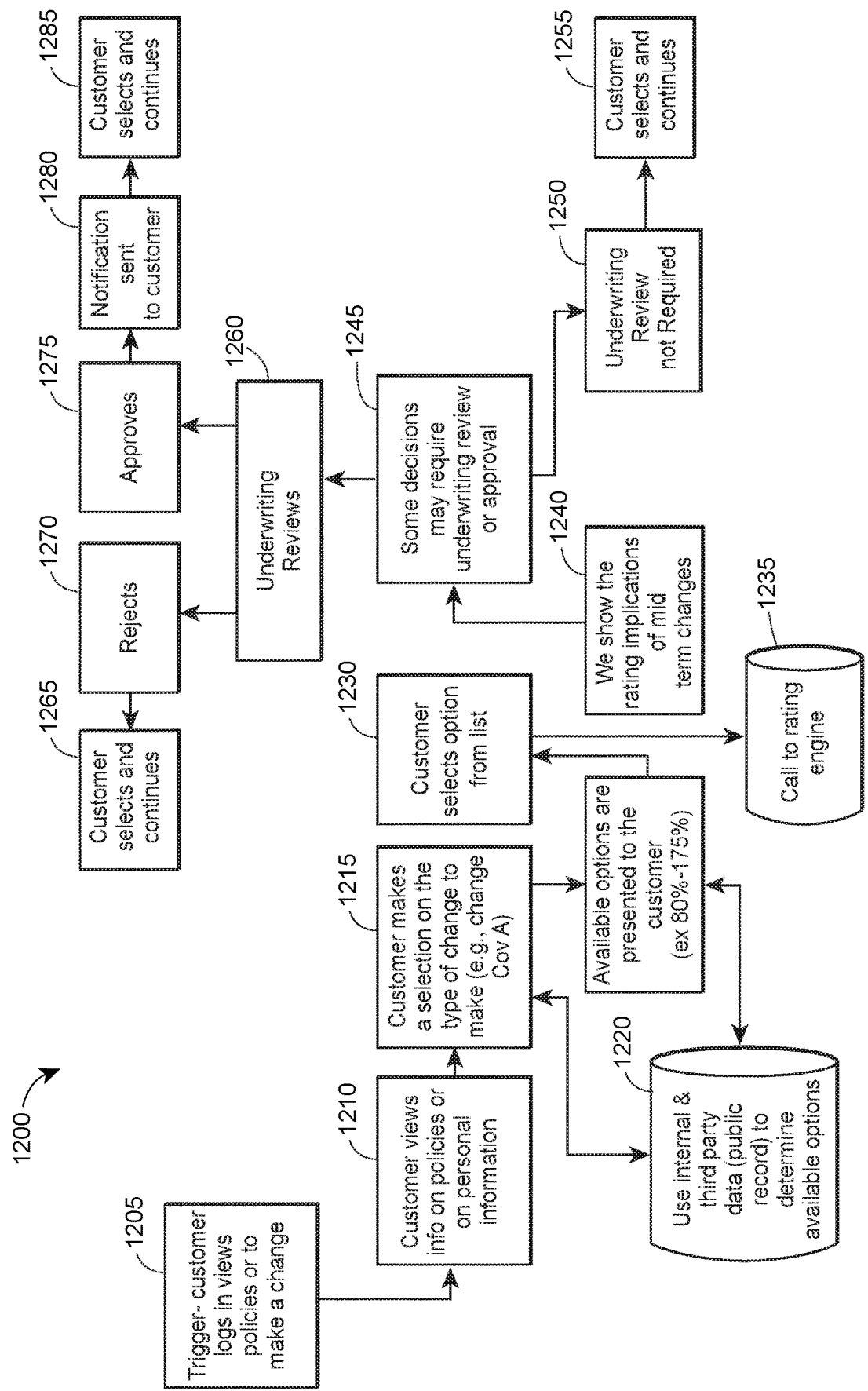
FIG. 12 depicts a flow diagram for an exemplary method for automatically generating life event data and/or insurance policy data based upon life event data and/or life events.

Exemplary Method for Automatically Generating Life Event Data and/or Insurance Policy Data Based Upon Life Event Data With reference to FIG. 12, a method of automatically generating life event data and/or insurance policy data (and/or insurance policies quotes, pricing, discounts, etc.) based upon life events and/or life event data 1200 may be implemented by a first processor (e.g., processor 525 of client device 505 of FIG. 5) executing, for example, at least a portion of modules 610-625 of FIG. 6, and/or a second processor (e.g., processor 550 of remote computing device 510 of FIG. 5) executing, for example, at least a portion of modules 710-755 of FIG. 7.

In particular, processor 525 may execute the life event user interface generation module 610 to cause the processor 525 to allow an insurance customer to view insurance policies (block 1205). The processor 525 may execute the life event user interface generation module 610 to cause the processor 525 to determine whether a life event has been triggered (block 1205). If the processor 525 determines that a life event question has been triggered (block 1205), the processor 525 may execute the life event presentation module 625 to cause the processor 525 to present insurance policies and personal information (e.g., insurance coverage, limit changes, insurance policy data, financial products, etc.) (block 1210). The processor 525 may execute a life event data receiving module 615 to receive life event data from, for example, a life event data source (block 1220). The processor 525 may execute the life event user interface generation module 610 to cause the processor 525 to allow an insurance customer make a selection on a type of change to make to an insurance policy (block 1215).

The processor 525 may execute the life event presentation module 625 to cause the processor 525 to present additional options (block 1225). The processor 525 may execute the life event user interface generation module 610 to cause the processor 525 to allow an insurance customer make a selection of an option from a list (block 1230). The processor 525 may execute an automatic life event data generation module 750 to cause the processor 525 to access an insurance rating engine based upon life event data (block 1235). The processor 525 may execute the life event presentation module 625 to cause the processor 525 to present a rating implication of midterm changes (block 1240).

A processor 550 may execute an automatic life event data generation module 750 to cause the processor 550 to determine whether insurance underwriter review is necessary based upon life event data (block 1245). If the processor 550 determines that insurance underwriter review is not necessary (block 1250), the processor 525 may execute the life event user interface generation module 610 to allow the insurance customer to select at least one option (block 1255). If the processor 550 determines that insurance underwriter review is necessary (block 1260), the processor 525 may execute the life event user interface generation module 610 to allow the insurance underwriter to reject at least one option (block 1270) and to send a notification to the insurance customer of the at least one rejected option (block 1265), to approve at least one option (block 1275) and to send a notification to the insurance customer of the at least one approved option (block 1280), and/or to allow the insurance customer to select the at least one approved option (block 1285). The method 1200 may include additional, less, or alternate actions, including those discussed elsewhere herein.

Figure 13:
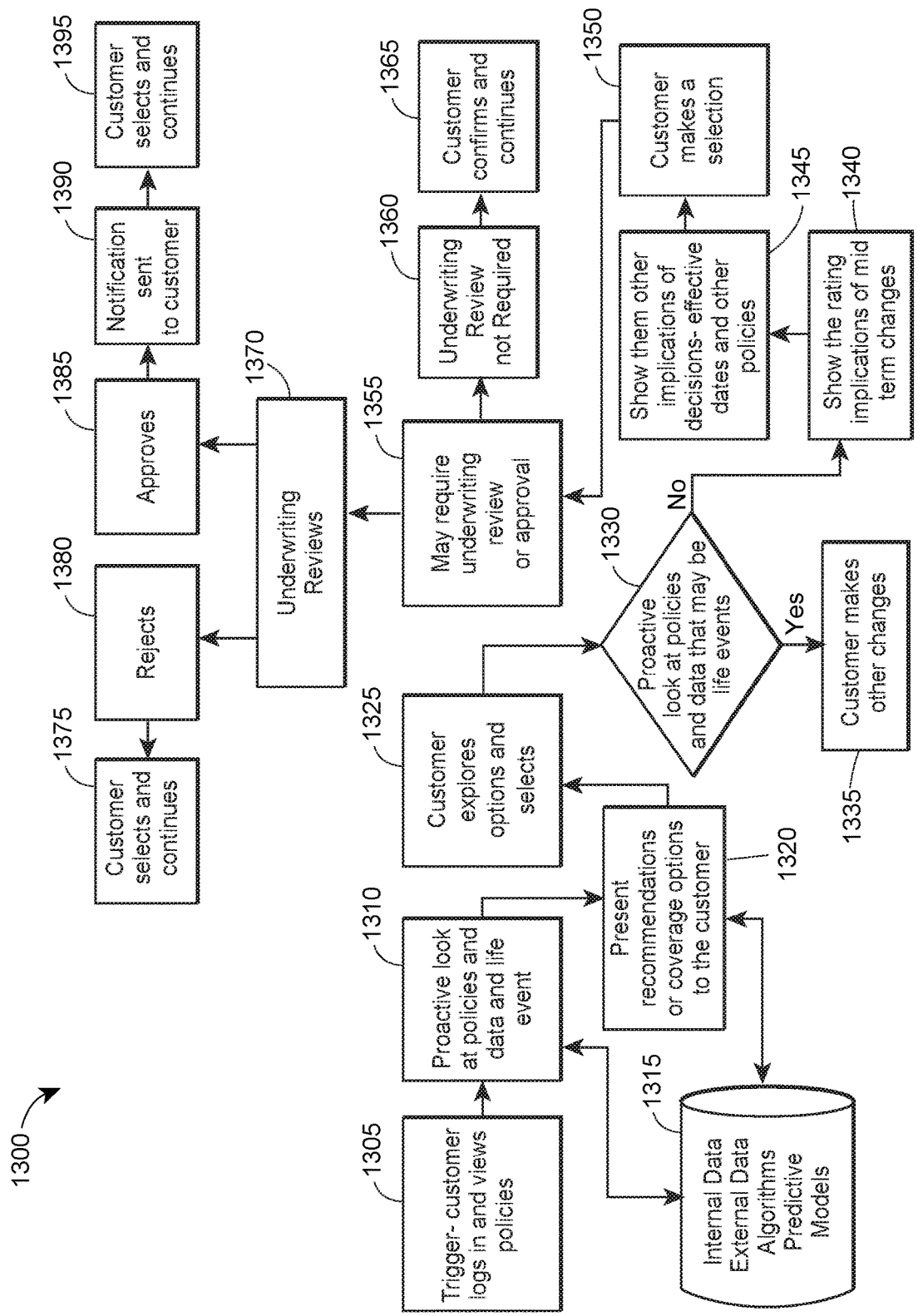
FIG. 13 depicts a flow diagram for an exemplary method for automatically generating life event data and/or insurance policy data based upon life event data and/or life events.

Exemplary Method for Automatically Generating Life Event Data and/or Insurance Policy Data Based Upon Life Event Data Turning to FIG. 13, a method of automatically generating life event data and/or insurance policy data (and/or insurance policies quotes, pricing, discounts, etc.) based upon life events and/or life event data 1300 may be implemented by a first processor (e.g., processor 525 of client device 505 of FIG. 5) executing, for example, at least a portion of modules 610-625 of FIG. 6, and/or a second processor (e.g., processor 550 of remote computing device 510 of FIG. 5) executing, for example, at least a portion of modules 710-755 of FIG. 7.

In particular, processor 525 may execute the life event user interface generation module 610 to cause the processor 525 to allow an insurance customer to view insurance policies (block 1305). The processor 525 may execute the life event user interface generation module 610 to cause the processor 525 to proactively look at policies and life event data (block 1310). The processor 525 may execute the life event presentation module 625 to cause the processor 525 to present insurance policies and personal information (e.g., insurance coverage, limit changes, insurance policy data, financial products, etc.) (block 1320).

The processor 525 may execute a life event data receiving module 615 to receive life event data from, for example, a life event data source (block 1315). The processor 525 may execute the life event user interface generation module 610 to cause the processor 525 to allow an insurance customer explore options (block 1325). The processor 525 may execute an automatic life event generation module 750 to cause the processor 525 to determine if there are implications to any change based upon life event data (block 1330). The processor 525 may execute the life event user interface generation module 610 to cause the processor 525 to allow an insurance customer make other changes (block 1335).

The processor 525 may execute the life event presentation module 625 to cause the processor 525 to present a rating implication of midterm changes (block 1340). The processor 525 may execute the life event presentation module 625 to cause the processor 525 to present other implications of decisions, effective dates and other policies (block 1345). The processor 525 may execute the life event user interface generation module 610 to cause the processor 525 to allow an insurance customer make at least one selection (block 1350).

A processor 550 may execute an automatic life event data generation module 750 to cause the processor 550 to determine whether insurance underwriter review is necessary based upon life event data (block 1355). If the processor 550 determines that insurance underwriter review is not necessary (block 1360), the processor 525 may execute the life event user interface generation module 610 to allow the insurance customer to confirm the selected option and continue (block 1365). If the processor 550 determines that insurance underwriter review is necessary (block 1270), the processor 525 may execute the life event user interface generation module 610 to allow the insurance underwriter to reject at least one option (block 1380) and to send a notification to the insurance customer of the at least one rejected option (block 1375), to approve at least one option (block 1385) and to send a notification to the insurance customer of the at least one approved option (block 1390), and/or to allow the insurance customer to confirm the at least one selected option and continue (block 1395). The method 1300 may include additional, less, or alternate functionality, including that discussed elsewhere herein.

Exemplary Computer-Implemented Method

In one aspect, a computer-implemented method for automatically generating insurance policy data may include automatically receiving, at a processor of a computing device, life event data from an electronic device, in response to the processor executing a life event data receiving module. The life event data may be representative of a life event of an insurance customer. The method may also include automatically generating, using a processor of a computing device, insurance policy data, based upon the life event data, in response to the processor executing an insurance policy data generation module. The insurance policy data may be representative of an insurance policy incorporating the life event of the insurance customer.

The life event data may be representative of at least one of: a marriage, a divorce, purchase of a vehicle, sale of a vehicle, a child birth, an adoption, a change of job, a change of employer, a name change, purchase of a home, sale of a home, rental of a home, purchase of personal articles (furs, jewelry, antiques, dining room set, entertainment systems, etc.), a death in the family, health change, and/or other life events, including those discussed elsewhere herein. The insurance policy data may be representative of at least one of: an insurance policies quote, insurance policy pricing, and/or insurance policy discounts.

The life event data may be automatically obtained from the insurance customer entering life event information via a user interface of a client device. The life event data may be automatically obtained from a life event data source with the insured or insurance customer's permission (such as the insured or insurance customer opts in to an insurance program that provides insurance recommendations and/or cost savings to the insured or insurance customer based upon certain life events). The life event data source may be at least one of: a bureau of motor vehicle data source, a court data source, a municipal data source, an obituary data source, an employment data source, a medical data source, and/or an adoption data source. The method may include additional, less, or alternate actions, including those discussed elsewhere herein.

Exemplary Computer System

In one aspect, a computer system for automatically generating insurance policy data may include a life event data receiving module stored on a memory that, when executed by a processor of a computing device, causes the processor to automatically receive life event data. The life event data may be representative of a life event of an insurance customer. The system may also include an insurance policy data generation module stored on a memory that, when executed by a processor of a computing device, may cause the processor to automatically generate insurance policy data, based upon the life event data. The insurance policy data may be representative of an insurance policy incorporating at least one life event of the insurance customer.

The system may further include a life events user interface module stored on a memory that, when executed by a processor of a client device, may cause the processor to receive life event data. The system may yet further include a life events data transmission module stored on a memory that, when executed by the processor of the client device, may cause the processor to automatically transmit life event data from a processor of a client device to a remote computing device. A processor of the remote computing device, executing an insurance policy data generation module, may generate insurance policy data based upon the life event data. The life event data receiving module may be stored on a memory of a remote computing device and, a processor of the remote computing device, may execute the life event data receiving module to automatically receive life event data from a life event data source with the insured's permission. The computer system may include additional, less, or alternate functionality, including that discussed elsewhere herein.

Exemplary Computer-Readable Medium

A non-transitory computer-readable medium storing instructions that, when executed by a processor of a computing device, may cause the processor to automatically generate insurance policy data may include a life event data receiving module that, when executed by a processor of a computing device, may cause the processor to automatically receive life event data. The life event data may be representative of a life event of an insurance customer. The non-transitory computer-readable medium may also include an insurance policy data generation module that, when executed by a processor of a computing device, may cause the processor to automatically generate insurance policy data, based upon the life event data. The insurance policy data may be representative of an insurance policy incorporating at least one life event of the insurance customer.

The non-transitory computer-readable medium may further include a life events user interface module that, when executed by a processor of a client device, may cause the processor to receive the life event data. A non-transitory computer-readable medium may yet further include a life events data transmission module that, when executed by the processor of the client device, may cause the processor to automatically transmit the life event data from the processor of the client device to a remote computing device. A processor of a remote computing device, executing an insurance policy data generation module, may generate the insurance policy data based upon life events and/or life event data.

A processor of a remote computing device, executing a life event data receiving module, may automatically receive life event data from a life event data source, such as with the insured's permission and/or opt-in to an insurance program that may provide with insurance cost savings and/or recommendations based upon life events automatically detected or determined by computer analysis. A life event data source may be at least one of: a bureau of motor vehicle data source, a court data source, a municipal data source, an obituary data source, an employment data source, a medical data source, or an adoption data source. Life event data may be representative of at least one of: a marriage, a divorce, purchase of a vehicle, sale of a vehicle, a child birth, an adoption, a change of job, a change of employer, a name change, purchase of a home, sale of a home, or rental of a home. Insurance policy data may be representative of at least one of: an insurance policies quote, insurance policy pricing, insurance policy discounts, etc. Execution of a life event user interface module may cause a processor to display at least one of: life event information or a life event question, in response to an insurance customer life event entry.

Additional Exemplary Computer-Implemented Methods

In one aspect, as shown with respect to FIG. 8, a computer-implemented method of updating an insurance policy and/or providing insurance-based recommendations may be provided. The method include (1) detecting or determining, via one or more processors, a life event associated with an existing or potential insurance customer has occurred or is about to occur; (2) automatically updating an insurance rating, via the one or more processors, based upon the life event and/or determining, via the one or more processors, an impact of the life event upon the existing or potential insurance customer and/or associated insurance policies (and/or updating, adjusting, or generating, via the one or more processors, an insurance policy, premium, rate, and/or discount based upon the life event); (3) automatically determining, via the one or more processors, whether to create or generate a new insurance policy and/or update or adjust an existing insurance policy; (4) automatically determining, via the one or more processors, if transfer of the new or existing insurance policy and/or insurance agent reassignment is necessary or desired based upon the life event and/or a location associated with the life event (such as a home address or move location); (5) automatically determining, via the one or more processors, if there is a gap in insurance coverage for the existing or potential insurance customer based upon the life event, and if so, providing recommendations to the existing or potential insurance customer that provides insurance coverage for the gap identified that exists because of the life event; (6) automatically determine, via the one or more processors, if there are cross selling opportunities that the existing or potential insurance customer may be interested in; and/or (7) presenting, under the direction or control of the one or more processors, insurance options and/or recommendations to the existing or potential insurance customer based upon computer analysis of the life event and/or existing insurance coverages and premiums for their review, approval, and/or modifications (such as via wireless communication and/or data transmission from the one or more processors to a mobile device of the existing or potential insurance customer) to facilitate enhancing the customer experience, providing cost savings to insurance customers, identifying potential loss exposures, and/or providing more adequate insurance coverage based upon life events. The method may include additional, less, or alternate actions, including those discussed elsewhere herein, and may be implemented via one or more local or remote processors, and/or via computer-executable instructions stored on non-transitory computer-readable medium or media.

For instance, detecting or determining, via one or more processors, a life event associated with an existing or potential insurance customer has occurred or is about to occur may include and/or involve: (i) the existing or potential insurance customer contacting an insurance provider (such as via telephone or mobile device), and an insurance provider representative enters data into a computer system; (ii) automatically detecting or determining, via the one or more processors, an actual life event from computer analysis of data and/or databases, such as DMV or court databases, marriage records, property records, obituaries, online databases, websites, social media, etc.; and/or (iii) automatically predicting, via the one or more processors, a life event from data mining, such as based upon changes in past coverage and increasing age of insureds and/or family members (such as teenagers becoming old enough to drive, go to college, get a job, etc.).

In another aspect, a computer-implemented method of updating an insurance policy and/or providing insurance-based recommendations may be provided. The method may include (1) detecting or determining, via one or more processors, a life event associated with an existing or potential insurance customer has occurred or is about to occur; (2) updating, adjusting, or generating, via the one or more processors, an insurance policy, premium, rate, and/or discount based upon the life event; (3) automatically determining, via the one or more processors, if there is a gap in insurance coverage for the existing or potential insurance customer based upon the life event, and if so, generating an insurance-based recommendation, via the one or more processors, that provides insurance coverage for the gap identified; and/or (4) causing, via the one or more processors, the insurance-based recommendation and/or updated insurance policy, premium, rate, and/or discount to be presented to the existing or potential insurance customer for the review, approval, or modification (such as via wireless communication with an insured's mobile device) to facilitate enhancing the customer experience, providing cost savings to insurance customers, identifying potential and/or new loss exposures, and/or providing more adequate insurance coverage based upon life events. The method may include additional, less, or alternate actions, including those discussed elsewhere herein, and may be implemented via one or more local or remote processors, and/or via computer-executable instructions stored on non-transitory computer-readable medium or media.

For instance, detecting or determining, via one or more processors, a life event associated with an existing or potential insurance customer has occurred or is about to occur may include and/or involve: (i) the existing or potential insurance customer contacting an insurance provider, and an insurance provider representative enters data into a computer system; (ii) automatically detecting or determining, via the one or more processors, an actual life event from computer analysis of data and/or databases, such as DMV or court databases, marriage records, property records, obituaries, online databases, websites, social media, etc.; and/or (iii) automatically predicting, via the one or more processors, a life event from data mining, such as based upon changes in past coverage and increasing age of insureds and/or family members.

The method may also include automatically determining, via the one or more processors, whether to create or generate a new insurance policy and/or update or adjust an existing insurance policy based upon the life event identified from computer analysis. The method may include automatically determining, via the one or more processors, if transfer of the new or existing insurance policy and/or insurance agent reassignment is necessary or desired, such as based upon a location associated with the life event. The method may include automatically determining, via the one or more processors, if there are cross selling opportunities that the existing or potential insurance customer may be interested in based upon the life event.

Other Exemplary Computer-Implemented Methods

In one aspect, a computer-implemented method of updating an insurance policy and/or providing insurance-based recommendations may be provided. The method may include (1) detecting or determining, via one or more processors, a life event associated with an existing or potential insurance customer has occurred or is about to occur; (2) automatically determining, via the one or more processors, if there is a gap in insurance coverage or recommended insurance coverage for the existing or potential insurance customer (or entire lack of appropriate insurance) based upon the life event, and if so, generating an insurance-related recommendation to the existing or potential insurance customer that provides insurance coverage for the gap in insurance coverage identified that exists because of the life event; and/or (3) directing or controlling, via the one or more processors and wireless communication or data transmission to a mobile device of the existing or potential insurance customer, the presentation of the insurance-related recommendation on a display associated with the mobile device for review or approval by the existing or potential insurance customer to facilitate providing more adequate insurance coverage based upon life events. The method may include additional, less, or alternate actions, including those discussed elsewhere herein, and/or the method may be implemented via a computer system, communication network, one or more processors, and/or computer-executable instructions stored on non-transitory storage media or computer-readable medium.

For instance, detecting or determining, via one or more processors, a life event associated with an existing or potential insurance customer has occurred or is about to occur may include and/or involve: automatically detecting or determining, via the one or more processors, an actual life event from computer analysis of data that includes one or more data sources selected from among Department of Motor Vehicle data, a court database, publicly available marriage or property records, obituaries, online databases, websites, and/or social media. Additionally or alternatively, detecting or determining, via one or more processors, a life event associated with an existing or potential insurance customer has occurred or is about to occur may include and/or involve: automatically predicting, via the one or more processors, a life event from data mining, such as based upon changes in past coverage, increasing age of an insured or family member, graduation from high school or college, and/or moving to a new address. Further, detecting or determining, via one or more processors, a life event associated with an existing or potential insurance customer has occurred or is about to occur may include and/or involve: the existing or potential insurance customer contacting an insurance provider via telephone or mobile device, and an insurance provider representative entering insurance customer-related data into a computer system.

The method may include automatically updating an insurance policy, premium, rating, or discount, via the one or more processors, based upon the life event; causing, via the one or more processors, the updated insurance policy, premium, rating, or discount to be presented on the mobile device for review or approval by the existing or potential insurance customer; and/or changing billing for the insurance policy, via the one or more processors, to the updated premium or discount.

The method may include automatically determining, via the one or more processors, whether to generate a new insurance policy and/or adjust an existing insurance policy based upon the life event; and/or causing, via the one or more processors, the new or updated insurance policy to be presented on the mobile device for review or approval by the existing or potential insurance customer. The method may include automatically determining, via the one or more processors, if transfer of an existing insurance policy and/or insurance agent reassignment should occur based upon the life event and/or a location associated with the life event.

The method may include automatically determining, via the one or more processors, if there are cross selling opportunities that the existing or potential insurance customer may be interested in; and/or causing, via the one or more processors, the products or services associated with the cross selling opportunities to be presented on the mobile device for review or approval by the existing or potential insurance customer, wherein the products or services relate to home or vehicle loans, or auto, home, life, or renters insurance. The cross selling opportunities may also, or alternatively, include financial services, such as retirement and/or education planning.

The insurance-related recommendation may include a lower auto insurance premium based upon age of the insured and/or marital status of the insured. The insurance-related recommendation may include an updated insurance premium or coverage based upon the life event, and the life event includes a marriage or divorce, buying or selling a vehicle, a birth or adoption, or a change in job or employer.

In one another aspect, a computer-implemented method of updating an insurance policy and/or providing insurance-based recommendations may be provided. The method may include: (1) detecting or determining, via one or more processors, a life event associated with an existing or potential insurance customer has occurred or is about to occur; (2) updating, adjusting, or generating, via the one or more processors, an insurance policy, premium, rate, or discount based upon the life event; and/or (3) causing or directing, via the one or more processors, the updated insurance policy, premium, rate, and/or discount to be presented to the existing or potential insurance customer for the review, approval, and/or modification via wireless communication or data transmission with their mobile device to facilitate providing more adequate insurance coverage based upon life events. The method may include additional, less, or alternate actions, including those discussed elsewhere herein, and/or the method may be implemented via a computer system, communication network, one or more processors, and/or computer-executable instructions stored on non-transitory storage media or computer-readable medium.

For instance, the method may include automatically determining, via the one or more processors, if there is a gap in insurance coverage or recommended insurance coverage (or lack of a particular type of insurance coverage) for the existing or potential insurance customer based upon the life event, and if so, generating an insurance-based recommendation, via the one or more processors, that provides insurance coverage for the gap identified and causing the insurance-based recommendation to be presented on the mobile device for customer review and approval. A gap in insurance coverage, or a lack of a particular type of insurance coverage, may be determined from computer analysis of a life event, existing insurance policies and coverages for the insured, and/or other customer-related or other data (such as data related to valuations of items to be insured, e.g., home, vehicle, personal belongings, etc).

For example, if it is determined from computer analysis of customer-related and/or other information that an insured has married, or about to marry or have a child, and if the insured has little or no life insurance, an appropriate level of life insurance may be calculated for the insured (such as based upon age, income or net worth, number of dependents, size of home mortgage (if any), amount of debt, etc.), and a corresponding recommendation may be transmitted to their mobile device for their review. On the other hand, if it is determined from computer analysis of customer-related and/or other information that an insured has gotten, or is about to get divorced, a reduction in life insurance may be appropriate or desirable.

As another example, if it is determined that the insured has gotten married or reached a certain age, a reduction in auto insurance premium or increase in auto insurance discount may be calculated and presented to the insured. Additionally or alternatively, if it is determined that the insured has gotten married, and the insured does not have a personal articles insurance policy, an appropriate level of coverage for a personal articles insurance policy may be calculated and presented to the insured, such as a policy based upon the value of a wedding and/or engagement ring, or other jewelry.

As another example, if it is determined from computer analysis of customer-related and/or other information that an insured has sold a vehicle, and/or bought a new vehicle, an adjustment to their auto insurance premium or discount may be calculated (such as based upon make, model, mileage, and price information of each vehicle) and provided to the insured for their review and approval via their mobile device. Additionally or alternatively, if it is determined from computer analysis of customer-related and/or other information that an insured has sold a home, and/or bought a new home, an adjustment to their homeowners insurance premium or discount may be calculated and provided to the insured for their review and approval via their mobile device. If it is determined from computer analysis of customer-related and/or other information that an insured has left one apartment, and/or moved into another apartment, an adjustment to their renters insurance premium or discount may be calculated and provided to the insured for their review and approval via their mobile device.

As other examples, if it is determined from computer analysis of customer-related and/or other information that an insured has adopted a new pet, appropriate pet insurance may be calculated and recommended to the customer, or that the insured has made a large purchase of personal belongings, appropriate personal articles insurance may be calculated and recommended to the customer. Other gaps associated with auto, homeowners, life, renters, pet, burial, personal articles, and/or other types of insurance may be identified from computer analysis of customer-related, insurance policy, and/or other information. For instance, from the computer analysis, it may be determined that the customer has too little or too much of certain type of insurance coverage, appropriate levels of insurance coverage may be calculated, and recommendations may be transmitted to the insured for their review (such as on their mobile device). Gaps may also, or alternatively, include financial services, such as retirement and/or education planning.

Detecting or determining, via one or more processors, a life event associated with an existing or potential insurance customer has occurred or is about to occur may include and/or involve: the existing or potential insurance customer contacting an insurance provider, and/or an insurance provider representative enters insurance customer-related data into a computer system. Detecting or determining, via one or more processors, a life event associated with an existing or potential insurance customer has occurred or is about to occur may include and/or involve: automatically detecting or determining, via the one or more processors, an actual life event from computer analysis of a court, marriage, or property database, the internet, social media, websites, and/or an online database. Additionally or alternatively, detecting or determining, via one or more processors, a life event associated with an existing or potential insurance customer has occurred or is about to occur may include and/or involve: automatically predicting, via the one or more processors, a life event from data mining and based upon changes in past coverage, new address, marital status, and/or an increasing age of an insured or family member.

The method may include automatically determining, via the one or more processors, whether to create or generate a new insurance policy and/or update or adjust an existing insurance policy based upon the life event identified from computer analysis, the life event including a marriage, divorce, move, new job, new vehicle, or new home, and the insurance policy is associated with life, auto, home, or personal articles insurance. The method may include automatically determining, via the one or more processors, if transfer of the new or existing insurance policy or if insurance agent reassignment is desirable based upon the life event or a location associated with the life event.

The method may include automatically determining, via the one or more processors, if there are cross selling opportunities that the existing or potential insurance customer may be interested in based upon the life event; and/or causing, via the one or more processors, the products or services associated with the cross selling opportunities to be presented on the mobile device for review or approval by the existing or potential insurance customer, wherein the products or services relate to home or vehicle loans, or auto, home, life, renters, or personal articles insurance.

Exemplary Computer System

In one aspect, a computer system configured for updating an insurance policy and/or providing insurance-based recommendations may be provided. The computer system may include one or more processors configured to: (1) detect or determine a life event associated with an existing or potential insurance customer has occurred or is about to occur, such as by analyzing insurance policy data and other data associated with a customer (for instance, by analyzing income, address, or age information); (2) automatically determine if there is a gap in insurance coverage or recommended insurance coverage (or lack of an appropriate type of insurance) for the existing or potential insurance customer based upon computer analysis of the life event and/or existing insurance coverages and premiums, and if so, generating an insurance-related recommendation for the existing or potential insurance customer that provides insurance coverage for the gap identified that exists because of the life event; and/or (3) cause the insurance-related recommendation to be presented on a display of a mobile device associated with the existing or potential insurance customer for their review, approval, and/or modification via wireless communication and/or data transmission to facilitate providing more adequate insurance coverage based upon life events. The computer system may include additional, less, or alternate functionality, including that discussed elsewhere herein, and may be implemented via computer-executable instructions stored on non-transitory computer-readable medium or media.

For instance, the one or more processors may be further configured to: automatically update an insurance policy, premium, rating, and/or discount based upon the life event or otherwise determine an impact of the life event upon the existing or potential insurance customer or an associated insurance policy; and/or cause the updated insurance policy, premium, rating, and/or discount to be presented on the mobile device display screen for review or approval by the existing or potential insurance customer.

The one or more processors may be further configured to: automatically determine whether to create or generate a new insurance policy and/or update or adjust an existing insurance policy; automatically determine if transfer of the new or existing insurance policy and/or insurance agent reassignment is necessary or desired based upon the life event and/or a location associated with the life event; and/or automatically determine if there are cross selling opportunities that the existing or potential insurance customer may be interested in, such as based upon stored customer preferences.

Detecting or determining, via the one or more processors, a life event associated with an existing or potential insurance customer has occurred or is about to occur may include and/or involve: (i) the existing or potential insurance customer contacting an insurance provider (such as via telephone or mobile device), and an insurance provider representative entering data into the computer system; (ii) automatically detecting or determining, via the one or more processors, an actual life event from computer analysis of data and/or databases, such as DMV or court databases, marriage records, property records, obituaries, online databases, websites, or social media; and/or (iii) automatically predicting, via the one or more processors, a life event from data mining, such as based upon changes in past coverage and increasing age of insureds and/or family members (such as teenagers becoming old enough to drive, go to college, get a job, etc.).

The computer system and/or associated processors may perform computer analysis on customer-related, insurance policy, and/or other information to identity gaps associated with auto, homeowners, life, renters, pet, burial, personal articles, and/or other types of insurance. For instance, from the computer analysis, the computer system may determine that the customer has too little or too much of certain type of insurance coverage, calculate appropriate levels of insurance coverage, generate recommendations, and transmit the recommendations via wireless communication and data transmission to an insured's mobile device for the insured's review, modification, or approval.

Additional Exemplary Computer Systems

In one aspect, a computer system configured for updating an insurance policy and/or providing insurance-based recommendations may be provided. The computer system may include one or more processors configured to: (1) detect or determine a life event associated with an existing or potential insurance customer has occurred or is about to occur; (2) automatically update an insurance rating based upon the life event and/or determine an impact of the life event upon the existing or potential insurance customer and/or associated insurance policies (and/or updating, adjusting, or generating, via the one or more processors, an insurance policy, premium, rate, and/or discount based upon the life event); (3) automatically determine whether to create or generate a new insurance policy and/or update or adjust an existing insurance policy; (4) automatically determine if transfer of the new or existing insurance policy and/or insurance agent reassignment is necessary or desired based upon the life event and/or a location associated with the life event; (5) automatically determine if there is a gap in insurance coverage for the existing or potential insurance customer based upon the life event, and if so, providing recommendations to the existing or potential insurance customer that provides insurance coverage for the gap identified that exists because of the life event; (6) automatically determine if there are cross selling opportunities that the existing or potential insurance customer may be interested in; and/or (7) present, under the direction or control of the one or more processors, insurance options and/or recommendations to the existing or potential insurance customer based upon computer analysis of the life event and/or existing insurance coverages and premiums for their review, approval, and/or modifications (such as via wireless communication and/or data transmission from the one or more processors to a mobile device of the existing or potential insurance customer) to facilitate enhancing the customer experience, providing cost savings to insurance customers, identifying potential loss exposures, and/or providing more adequate insurance coverage based upon life events. Detecting or determining, via one or more processors, a life event associated with an existing or potential insurance customer has occurred or is about to occur includes and/or may involve: (i) the existing or potential insurance customer contacting an insurance provider (such as via telephone or mobile device), and an insurance provider representative enters data into a computer system; (ii) automatically detecting or determining, via the one or more processors, an actual life event from computer analysis of data and/or databases, such as DMV or court databases, marriage records, property records, obituaries, online databases, websites, social media, etc.; and/or (iii) automatically predicting, via the one or more processors, a life event from data mining, such as based upon changes in past coverage and increasing age of insureds and/or family members (such as teenagers becoming old enough to drive, go to college, get a job, etc.).

In another aspect, a computer system configured for updating an insurance policy and/or providing insurance-based recommendations may be provided. The computer system may include one or more processors configured to: (1) detect or determine a life event associated with an existing or potential insurance customer has occurred or is about to occur; (2) update, adjust, or generate an insurance policy, premium, rate, and/or discount based upon the life event; (3) automatically determine if there is a gap in insurance coverage for the existing or potential insurance customer based upon the life event, and if so, generate an insurance-based recommendation that provides insurance coverage for the gap identified; and/or (4) causing the insurance-based recommendation and/or updated insurance policy, premium, rate, and/or discount to be presented to the existing or potential insurance customer for the review, approval, or modification (such as via wireless communication with an insured's mobile device) to facilitate enhancing the customer experience, providing cost savings to insurance customers, identifying potential and/or new loss exposures, and/or providing more adequate insurance coverage based upon life events.

Detecting or determining a life event associated with an existing or potential insurance customer has occurred or is about to occur may include and/or involve: (i) the existing or potential insurance customer contacting an insurance provider, and an insurance provider representative enters data into a computer system; (ii) automatically detecting or determining, via the one or more processors, an actual life event from computer analysis of data and/or databases, such as DMV or court databases, marriage records, property records, obituaries, online databases, websites, social media, etc.; and/or (iii) automatically predicting, via the one or more processors, a life event from data mining, such as based upon changes in past coverage and increasing age of insureds and/or family members.

The one or more processors may be further configured to: automatically determine whether to create or generate a new insurance policy and/or update or adjust an existing insurance policy based upon the life event identified from computer analysis. The one or more processors may be further configured to: automatically determine if transfer of the new or existing insurance policy and/or insurance agent reassignment is necessary or desired, such as based upon the life event and/or a location associated with the life event. The one or more processors may be further configured to: automatically determine if there are cross selling opportunities that the existing or potential insurance customer may be interested in based upon the life event.

The foregoing computer systems and/or processors may include additional, less, or alternate functionality, including that discussed elsewhere herein, and/or may be implemented via computer-executable instructions stored on non-transitory computer-readable media or medium.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. A computer implemented method for automatically generating insurance policy data and for updating an insurance policy and/or providing insurance-based recommendations based on the insurance policy data, the method comprising:

receive, from an insurance customer via a user interface, original insurance policy data, wherein the original insurance policy data is representative of a life status of an insurance customer when the original insurance policy data is received;

automatically receiving, at a processor of a computing device, life event data from at least one data source, in response to the processor executing a life event data receiving module, wherein the life event data is representative of at least one life event of the insurance customer;

automatically generating, using a processor of a computing device, changed insurance policy data, based upon a comparison of the original insurance policy data with the life event data, in response to the processor executing an insurance policy data generation module, wherein the changed insurance policy data is representative of an insurance policy incorporating options for the insurance customer;

automatically generating, using a processor of an insurance customer computing device, a life event user interface on a display of the insurance customer computing device based on the changed insurance policy data, in response to the processor of the insurance customer computing device executing a life event user interface generation module, wherein the life event user interface notifies the insurance customer of the options for the insurance customer and allows the insurance customer to select at least one option; and receiving, at the processor of the insurance customer computing device, response data, wherein the response data is indicative of a selection of at least one option by the insurance customer.

2. The method of claim 1, wherein the life event data is further representative of at least one of: a change of state of residency, a marriage, a divorce, purchase of a vehicle, sale of a vehicle, a child birth, an adoption, a change of job, a change of employer, purchase of a home, sale of a home, rental of a home, or a purchase of a personal article.

3. The method of claim 1, wherein the insurance policy data is representative of at least one of: an insurance policies quote, insurance policy pricing, or insurance policy discounts.

4. The method of claim 1, wherein the life event data is automatically obtained, at the processor of the computing device, from the insurance customer entering life event information via a user interface of a client device.

5. The method of claim 1, wherein the changed insurance policy data is stored in an insurance provider data source.

6. The method of claim 1, wherein the data source is at least one of: a bureau of motor vehicle data source, a court data source, a municipal data source, an obituary data source, an employment data source, a medical data source, or an adoption data source.

7. A computer system for automatically generating insurance policy data and for updating an insurance policy and/or providing insurance-based recommendations based on the insurance policy data, the system comprising:

an original insurance policy data receiving module stored on a memory that, when executed by a processor of a computing device, causes the processor to receive original insurance policy data from an insurance customer via a user interface, wherein the original insurance policy data is representative of a life status of an insurance customer when the original insurance policy data is receive;

a life event data receiving module stored on a memory that, when executed by a processor of a computing device, causes the processor to automatically receive life event data from at least one data source, wherein the life event data is representative of at least one life event of the insurance customer;

an insurance policy data generation module stored on a memory that, when executed by a processor of a computing device, causes the processor to automatically generate changed insurance policy data, based upon a comparison of the original insurance policy data with the life event data, wherein the changed insurance policy data is representative of an insurance policy incorporating options for the insurance customer;

a life event user interface generation module stored on a memory that, when executed by a processor of an insurance customer computing device, causes the processor of the insurance customer computing device to automatically generate a life event user interface on a display of the insurance customer computing device based on the changed insurance policy data, wherein the life event user interface notifies the insurance customer of options for the insurance customer and allows the insurance customer to select at least one option; and an insurance customer response data receiving module stored on a memory that, when executed by the processor of the insurance customer computing device, causes the processor to receive response data, wherein the response data is indicative of a selection of at least one option by the insurance customer.

8. The system of claim 7, further comprising:
a life events user interface module stored on a memory that, when executed by a processor of a client device, causes the processor to receive the life event data.

9. The system of claim 8, further comprising:
a life events data transmission module stored on a memory that, when executed by the processor of the client device, causes the processor to automatically transmit the life event data from the processor of the client device to a remote computing device.

10. The system of claim 9, wherein the insurance policy data generation module is stored on a memory of the remote computing device and, wherein a processor of the remote computing device, executing the insurance policy data generation module, generates the insurance policy data based upon the life event data.

11. The system of claim 7, wherein the life event data receiving module is stored on a memory of a remote computing device and, wherein a processor of the remote computing device, executing the life event data receiving module, automatically receives the life event data from at least one of: a bureau of motor vehicle data source, a court data source, a municipal data source, an obituary data source, an employment data source, a medical data source, or an adoption data source.

12. A non-transitory computer-readable medium storing instructions that, when executed by a processor of a computing device, cause the processor to automatically generate insurance policy data and for updating an insurance policy and/or providing insurance-based recommendations based on the insurance policy data, the non-transitory computer-readable medium comprising:

an original insurance policy data receiving module that, when executed by a processor of a computing device, causes the processor to receive original insurance policy data from an insurance customer via a user interface, wherein the original insurance policy data is representative of a life status of an insurance customer when the original insurance policy data is receive;

a life event data receiving module that, when executed by a processor of a computing device, causes the processor to automatically receive life event data from at least one data source, wherein the life event data is representative of at least one life event of the insurance customer;

an insurance policy data generation module that, when executed by a processor of a computing device, causes the processor to automatically generate changed insurance policy data, based upon a comparison of the original insurance policy data with the life event data, wherein the changed insurance policy data is representative of an insurance policy incorporating options for the insurance customer;

a life event user interface generation module that, when executed by a processor or an insurance customer computing device, causes the processor of the insurance customer computing device to automatically generate a life event user interface on a display of the insurance customer computing device based on the changed insurance policy data, wherein the life event user interface notifies the insurance customer of the options for the insurance customer and allows the insurance customer to select at least one option; and an insurance customer response data receiving module that, when executed by the processor of the insurance customer computing device, causes the processor to receive response data, wherein the response data is indicative of a selection of at least one option by the insurance customer.

13. The non-transitory computer-readable medium of claim 12, further comprising:
a life events user interface module that, when executed by a processor of a client device, causes the processor to receive the life event data.

14. The non-transitory computer-readable medium of claim 13, further comprising:
a life events data transmission module that, when executed by the processor of the client device, causes the processor to automatically transmit the life event data from the processor of the client device to a remote computing device.

15. The non-transitory computer-readable medium of claim 14, wherein a processor of the remote computing device, executing the insurance policy data generation module, generates the insurance policy data based upon the life event data.

16. The non-transitory computer-readable medium of claim 12, wherein a processor of a remote computing device, executing the life event data receiving module, automatically receives the life event data from at least one of: a bureau of motor vehicle data source, a court data source, a municipal data source, an obituary data source, an employment data source, a medical data source, or an adoption data source.

17. The non-transitory computer-readable medium of claim 12, wherein the data source is at least one of: a bureau of motor vehicle data source, a court data source, a municipal data source, an obituary data source, an employment data source, a medical data source, or an adoption data source.

18. The non-transitory computer-readable medium of claim 12, wherein the life event data is further representative of at least one of: a change of state of residency, a marriage, a divorce, purchase of a vehicle, sale of a vehicle, a child birth, an adoption, a change of job, a change of employer, purchase of a home, sale of a home, rental of a home, or a purchase of a personal article.

19. The non-transitory computer-readable medium of claim 12, wherein the insurance policy data is representative of at least one of: an insurance policies quote, insurance policy pricing, or insurance policy discounts.

20. The non-transitory computer-readable medium of claim 13, wherein execution of the life event user interface module causes the processor to display at least one of: life event information or a life event question, in response to an insurance customer life event entry.

\* \* \* \* \*